United States Patent
Han et al.

(10) Patent No.: US 11,227,149 B2
(45) Date of Patent: Jan. 18, 2022

(54) METHOD AND APPARATUS WITH LIVENESS DETECTION AND OBJECT RECOGNITION

(71) Applicant: Samsung Electronics Co., Ltd., Suwon-si (KR)

(72) Inventors: Jaejoon Han, Seoul (KR); Hana Lee, Suwon-si (KR); Jihye Kim, Anyang-si (KR); Jingtao Xu, Beijing (CN); Chang Kyu Choi, Seongnam-si (KR); Hangkai Tan, Beijing (CN); Jiaqian Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 16/707,241

(22) Filed: Dec. 9, 2019

(65) Prior Publication Data

US 2020/0210690 A1    Jul. 2, 2020

(30) Foreign Application Priority Data

Dec. 28, 2018   (CN) .......................... 201811622520.0
Oct. 4, 2019    (KR) .......................... 10-2019-0122984

(51) Int. Cl.
*G06K 9/00*     (2006.01)
*G06T 7/50*     (2017.01)
(Continued)

(52) U.S. Cl.
CPC ..... *G06K 9/00335* (2013.01); *G06K 9/00201* (2013.01); *G06K 9/46* (2013.01);
(Continued)

(58) Field of Classification Search
CPC .. G06K 9/00335; G06K 9/00201; G06K 9/46; G06K 9/00268; G06K 9/00288;
(Continued)

(56) References Cited

U.S. PATENT DOCUMENTS 8,457,367 B1    6/2013   Sipe et al.
8,457,369 B2*   6/2013   Nakada ..................... G06T 7/44
                                                      382/124
(Continued)

FOREIGN PATENT DOCUMENTS

CN    108304708 A  *  7/2018  ......... G06K 9/00255
JP    5445460 B2       3/2014
(Continued)

OTHER PUBLICATIONS

Synthetic Depth-of-Field with a Single-Camera Mobile Phone, Neal Wadhwa et al., ACM Trans. Graph., vol. 37, No. 4, Article 64. Publication date: Aug. 2018, p. 64:1-64:13 (Year: 2018).*

(Continued)

*Primary Examiner* — Jayesh A Patel
(74) *Attorney, Agent, or Firm* — NSIP Law

(57) ABSTRACT

A processor-implemented liveness detection method includes: obtaining an initial image using a dual pixel sensor; obtaining a left image and a right image from the initial image; and detecting liveness of an object included in the initial image using the left image and the right image.

27 Claims, 19 Drawing Sheets

(51) Int. Cl.
  *G06T 7/73* (2017.01)
  *G06K 9/46* (2006.01)
(52) U.S. Cl.
  CPC .............. *G06T 7/50* (2017.01); *G06T 7/73* (2017.01); *G06K 9/00268* (2013.01); *G06K 9/00288* (2013.01); *G06T 2207/10028* (2013.01); *G06T 2207/20084* (2013.01)
(58) Field of Classification Search
  CPC ... G06T 7/50; G06T 7/73; G06T 2207/10028; G06T 2207/20084
  See application file for complete search history.

(56) References Cited

U.S. PATENT DOCUMENTS

| | | | | |
|---|---|---|---|---|
| 8,743,209 | B2* | 6/2014 | Funamoto | G02B 27/0093 348/169 |
| 8,798,336 | B2 | 8/2014 | Nechyba et al. | |
| 8,947,572 | B2 | 2/2015 | Venezia et al. | |
| 9,767,358 | B2 | 9/2017 | Xue et al. | |
| 10,289,825 | B2* | 5/2019 | Chandraker | G06K 9/00255 |
| 10,410,368 | B1* | 9/2019 | Galor Gluskin | G06T 7/593 |
| 2010/0158319 | A1 | 6/2010 | Jung et al. | |
| 2012/0300083 | A1* | 11/2012 | Funamoto | H04N 5/23218 348/169 |
| 2014/0368618 | A1* | 12/2014 | Ushinaga | H04N 13/207 348/49 |
| 2015/0161434 | A1* | 6/2015 | Ross | G06F 21/32 382/118 |
| 2015/0264567 | A1* | 9/2015 | Sensharma | G06K 9/22 455/411 |
| 2015/0339826 | A1* | 11/2015 | Buibas | B60R 1/00 382/106 |
| 2016/0353017 | A1* | 12/2016 | Kim | H04N 5/2328 |
| 2017/0278289 | A1* | 9/2017 | Marino | G06T 11/60 |
| 2018/0077337 | A1* | 3/2018 | Fujii | H04N 5/36961 |
| 2018/0131862 | A1* | 5/2018 | Galor Gluskin | H04N 5/232122 |
| 2018/0137629 | A1* | 5/2018 | Mishma | G06T 7/174 |
| 2018/0165508 | A1 | 6/2018 | Othman et al. | |
| 2018/0302552 | A1* | 10/2018 | Shionoya | H04N 5/23216 |
| 2018/0324359 | A1* | 11/2018 | Pan | H04N 5/23267 |
| 2018/0349378 | A1* | 12/2018 | Galor Gluskin | G02B 7/38 |
| 2019/0019835 | A1* | 1/2019 | Tanaka | H04N 9/04561 |
| 2019/0020838 | A1* | 1/2019 | Hatakeyama | H04N 9/04557 |
| 2019/0080646 | A1* | 3/2019 | Luo | G02F 1/1323 |
| 2019/0108387 | A1* | 4/2019 | Rivard | G06K 9/2054 |
| 2019/0191117 | A1* | 6/2019 | Nakata | G02B 5/201 |
| 2019/0213309 | A1* | 7/2019 | Morestin | G01S 7/4865 |
| 2019/0213435 | A1* | 7/2019 | Nikhara | G06T 7/50 |
| 2019/0327393 | A1* | 10/2019 | Yang | G06T 7/571 |
| 2019/0362058 | A1* | 11/2019 | Liu | G06K 9/00268 |
| 2020/0077029 | A1* | 3/2020 | Liu | H04N 5/36961 |
| 2020/0104034 | A1* | 4/2020 | Lee | G06T 11/00 |
| 2020/0210733 | A1* | 7/2020 | Noble | G06T 7/557 |
| 2020/0221064 | A1* | 7/2020 | Yerushalmy | H04N 13/128 |
| 2020/0235149 | A1* | 7/2020 | Shiraishi | B60R 11/04 |
| 2020/0275038 | A1* | 8/2020 | Matsui | H04N 5/23235 |
| 2021/0058604 | A1* | 2/2021 | Nakata | G03B 35/08 |

FOREIGN PATENT DOCUMENTS

| | | | | |
|---|---|---|---|---|
| WO | WO-02082545 A1 * | 10/2002 | | H04N 5/23248 |
| WO | WO 2018/199542 A1 | 11/2018 | | |

OTHER PUBLICATIONS

Face Liveness Detection by Learning Multispectral Reflectance Distributions, Zhiwei Zhang et al., RESEARCHGATE, Apr. 2011, pp. 1-7 (Year: 2011).*

Liveness Detection for Embedded Face Recognition Syatem., Hyung-Keun Jee et al., World Academy of Science, Engineering and Technology, 2008, pp. 941-944 (Year: 2008).*

Atoum, Youef et al., "Face Anti-Spoofing Using Patch and Depth-Based CNNs", *2017 IEEE International Joint Conference on Biometrics (IJCB)*, 2017 (pp. 1-10).

Extended European Search Report dated May 18, 2020 in counterpart European Patent Application No. 19212226.5 (7 pages in English).

* cited by examiner

FIG. 7
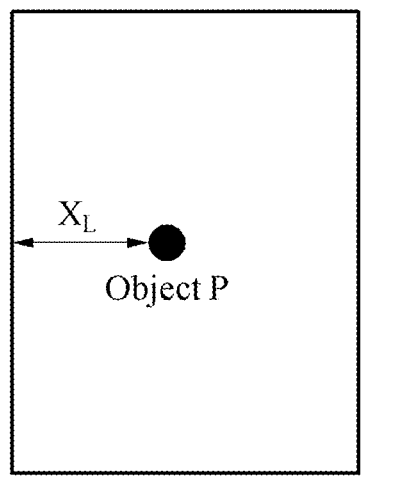
Left image
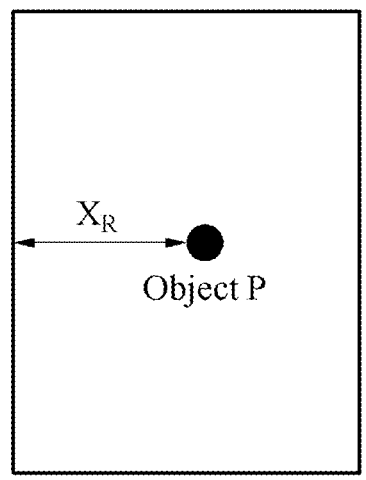
Right image
Phase difference d
= $X_L - X_R$

# METHOD AND APPARATUS WITH LIVENESS DETECTION AND OBJECT RECOGNITION

CROSS-REFERENCE TO RELATED APPLICATIONS

This application claims the benefit under 35 USC § 119(a) of Chinese Patent Application No. 201811622520.0 filed on Dec. 28, 2018, in the State Intellectual Property Office of the P.R.C. and Korean Patent Application No. 10-2019-0122984 filed on Oct. 4, 2019, in the Korean Intellectual Property Office, the entire disclosures of which are incorporated herein by reference for all purposes.

BACKGROUND

1. Field

The following description relates to a method and apparatus with liveness detection and object recognition, and/or liveness detection and object detection.

2. Description of Related Art

In a user verification system, a computing apparatus may determine whether to allow a user to have access to the computing apparatus based on verification information provided by the user. The verification information may include, for example, a password input by the user and biometric information of the user. The biometric information may include, for example, information associated with a fingerprint, an iris, and a face of the user.

Face spoofing may be a type of attack using, for example, an image, a video, or a mask that intends to spoof or trick an underlying device or system to believe that an authorized user or person is attempting access or use of the device or system. Face anti-spoofing technology may be used to determine whether a face input to such a device or system is a fake face or a genuine face. The face anti-spoofing technology may include extracting features, such as, for example, a local binary pattern (LBP), a histogram of oriented gradients (HOG), and a difference of Gaussians (DoG), from an input image and determining whether a detected face is fake or genuine based on the extracted features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented liveness detection method includes: obtaining an initial image using a dual pixel sensor; obtaining a left image and a right image from the initial image; and detecting liveness of an object included in the initial image using the left image and the right image.

The detecting of the liveness of the object may include: processing the left image and the right image by performing one or more operations using the left image and the right image; and detecting the liveness of the object based on a liveness score obtained from a neural network by inputting a result of the processing to the neural network.

The result of the processing may indicate depth information of the object.

The processing of the left image and the right image may include: determining either one or both of a difference between the left image and the right image, and a ratio of the difference to either one of the left image and the right image.

The processing of the left image and the right image may include: determining a difference map based on a difference between the left image and the right image; determining a shifted difference map by shifting the left image and the right image in different directions, respectively, and calculating a difference between the shifted left image and the shifted right image; and determining a second difference map based on a difference between the difference map and the shifted difference map.

The left image may be shifted in either one of an upward or downward direction and the right image may be shifted in another one of the upward and downward direction different from the one of the upward or downward direction.

The processing of the left image and the right image may include: determining a derivative map by calculating a ratio of a difference, between the left image and the right image, to either one of the left image and the right image; determining a shifted derivative map by calculating a ratio of a shifted difference, between a shifted left image and a shifted right image respectively obtained by shifting the left image and the right image in different directions, to either one of the shifted left image and the shifted right image; and determining a second derivative map based on a ratio of a further difference, between the derivative map and the shifted derivative map, to either one of the derivative map and the shifted derivative map.

The processing of the left image and the right image may include: determining a difference map based on a difference between a first-level feature map of the left image and a first-level feature map of the right image; determining a shifted difference map by calculating a difference, between a shifted first-level feature map of a shifted left image and a first-level feature map of a shifted right image respectively obtained by shifting the left image and the right image in different directions; and determining a second difference map based on a difference between a second-level feature map of the difference map and a second-level feature map of the shifted difference map.

The first-level feature map of the left image, the first-level feature map of the right image, the first-level feature map of the shifted left image, and the first-level feature map of the shifted right image may be generated by respectively inputting the left image, the right image, the shifted left image, and the shifted right image into a first-level neural network, and the second-level feature map of the difference map and the second-level feature map of the shifted difference map may be generated by respectively inputting the difference map and the shifted difference map into a second-level neural network.

The second-level feature maps may include a greater number of channels than the first-level feature maps.

The processing of the left image and the right image may include: determining a derivative map by calculating a ratio of a difference between a first-level feature map of the left image and a first-level feature map of the right image to either one of the first-level feature map of the left image and the first-level feature map of the right image; determining a shifted derivative map by calculating a ratio of a difference between a first-level feature map of a left image and a first-level feature map of a right image that are obtained by shifting the left image and the right image in different directions, respectively, to either one of the first-level feature map of the shifted left image and the first-level feature map of the shifted right image; and determining a second derivative map based on a ratio of a difference between a second-level feature map of the derivative map and a second-level feature map of the shifted derivative map to either one of the second-level feature map of the derivative map and the second-level feature map of the shifted derivative map.

The processing of the left image and the right image may include: determining a difference map based on a difference between the left image and the right image; determining a shifted difference map by shifting the left image and the right image in different directions, respectively, and calculating a difference between the shifted left image and the shifted right image; and determining a second difference map based on a difference between a feature map of the difference map and a feature map of the shifted difference map.

The feature map of the difference map and the feature map of the shifted difference map may be generated by respectively inputting the difference map and the shifted difference map into another neural network.

The processing of the left image and the right image may include: determining a derivative map by calculating a ratio of a difference between the left image and the right image to either one of the left image and the right image; determining a shifted derivative map by calculating a ratio of a difference between a left image and a right image that are obtained by shifting the left image and the right image in different directions, respectively, to one either of the shifted left image and the shifted right image; and determining a second derivative map based on a ratio of a difference between a feature map of the derivative map and a feature map of the shifted derivative map to either one of the feature map of the derivative map and the feature map of the shifted derivative map.

The obtaining of the left image and the right image from the initial image may include: separating left and right signals included in each of pixels in the initial image; and reconstructing the left image and the right image from the separated left and right signals, respectively.

The dual pixel sensor may be a single camera including dual pixels each including two photodiodes.

The liveness detection may include detecting the liveness of the object in response to the object being included in the initial image, and may further include: in response to a determination that the object is live as a result of the liveness detection, performing object recognition on the object; and performing an operation based on a result of the object recognition.

A non-transitory computer-readable storage medium may store instructions that, when executed by one or more processors, configure the one or more processors to perform the method.

In another general aspect, a processor-implemented object recognition method for a computing device includes: obtaining an initial image from a dual pixel sensor; in response to an object, which is a target for liveness detection, being included in the initial image, detecting liveness of the object using a left image and a right image obtained from the initial image; in response to a determination that the object is live as a result of the liveness detection, performing object recognition on the object; and controlling an operation of the computing device based on a result of the object recognition.

In another general aspect, a liveness detection apparatus includes: one or more processors configured to: obtain an initial image using a dual pixel sensor; obtain a left image and a right image from the initial image; and detect liveness of an object included in the initial image using the left image and the right image.

For the detecting of the liveness of the object, the one or more processors may be configured to: process the left image and the right image by performing one or more operations using the left image and the right image; and detect the liveness of the object based on a liveness score obtained from a neural network by inputting a result of the processing to the neural network.

The result of the processing may indicate depth information of the object.

For the processing of the left image and the right image, the one or more processors may be configured to: determine either one or both of a difference between the left image and the right image, and a ratio of the difference to either one of the left image and the right image.

For the obtaining of the left image and the right image from the initial image, the one or more processors may be configured to: separate left and right signals included in each of pixels in the initial image; and reconstruct the left image and the right image from the separated left and right signals, respectively.

The dual pixel sensor may be a single camera including dual pixels each including two photodiodes.

The apparatus may be any of a smartphone, a wearable device, a tablet computer, a netbook, a laptop computer, a desktop computer, a personal digital assistant (PDA), a set-top box, a home appliance, a biometric door lock, a security device, and a vehicle start device, and the apparatus includes a camera including the dual pixel sensor.

In another general aspect, a liveness detection method includes: constructing a left image and a right image from an initial image received from a dual pixel image sensor; and determining a difference map based on a difference between the left image and the right image; determining a shifted difference map based on a difference between a truncated image of the left image and a truncated image of the right image; determining another difference map based on the difference map and the shifted difference map; and detecting liveness of an object included in the initial image based on the other difference map.

The other difference map may be either one of a second difference map and a second derivative map.

In the difference map, a maximum feature value may correspond to a background area of the initial image, and in the shifted difference map, a maximum feature value may correspond to a foreground area of the initial image.

Other features and aspects will be apparent from the following detailed description, the drawings, and the claims.

BRIEF DESCRIPTION OF THE DRAWINGS

FIGS. 6 through 8 are diagrams illustrating examples of a dual pixel sensor.

Figure 1:
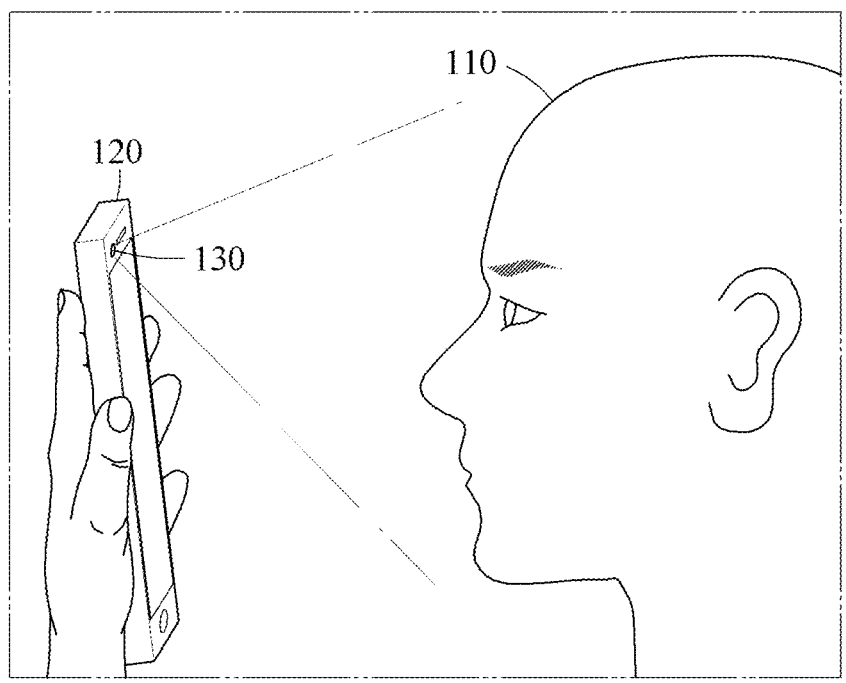
FIGS. 1 and 2 are diagrams illustrating examples of liveness detection.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including," when used herein, specify the presence of stated features, integers, operations, elements, and/or components, but do not preclude the presence or addition of one or more other features, integers, operations, elements, components and/or groups thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description could result in an ambiguous interpretation of the example embodiments.

Hereinafter, examples will be described in detail with reference to the accompanying drawings, and like reference numerals in the drawings refer to like elements throughout.

Figure 2:
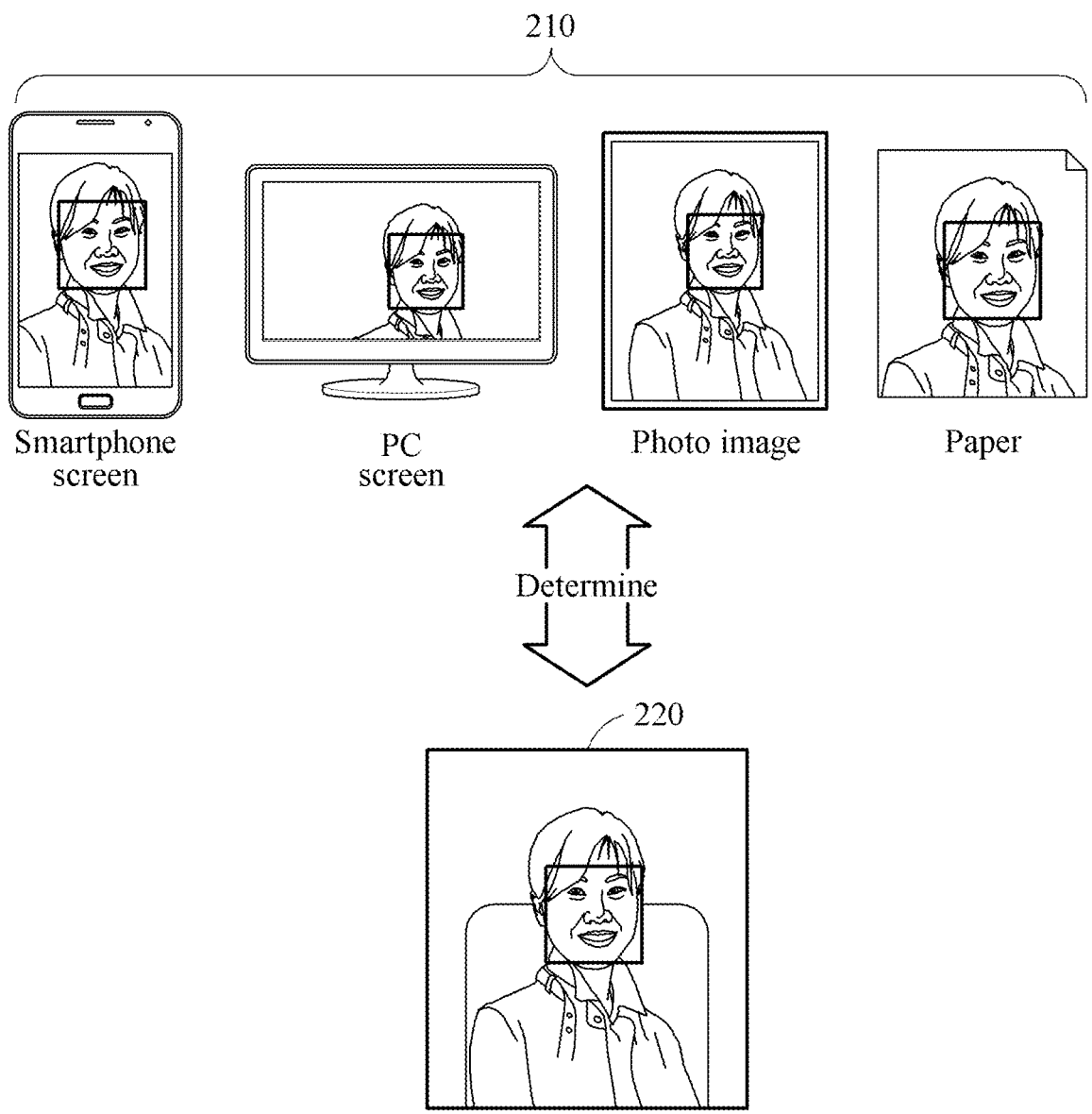

FIGS. 1 and 2 are diagrams illustrating examples of liveness detection.

Liveness detection may be performed to determine whether a target for the liveness detection is live or not. For example, the liveness detection may be performed to determine whether a face in an image captured by a camera is a genuine face or a fake face, or to determine whether the face in the image belongs to an alive person in the image or to an inanimate object in the image. In an example, the liveness detection may be used to determine liveness of a verification target for user verification that is further performed for user log-in, payment services, access control, and the like in various examples. Herein, the verification target for the user verification refers to a target to be under the user verification and may be the same as the target for the liveness detection. For example, in a user verification system, the liveness detection may be performed to distinguish, using captured image(s), between a lifeless object (as a non-limiting example, a photograph, an image, a paper, and a replica as a fake mechanism or form) and a living object (as a non-limiting example, a live human being) by distinguishing whether an object in the captured image is or is more likely a live object or the object is or is more likely a spoofed object.

An invalid user may use a spoofing technique in an attempt to obtain a false acceptance by the user verification system. For example, the invalid user may present, to a camera of the user verification system, a color image, a video, a replica, and the like in which a face of a valid user appears, to obtain a false acceptance in facial verification. The liveness detection may prevent such false acceptance by filtering out, or blocking, an attempt for the verification made based on such spoofing technique. When a verification target is determined to be a lifeless object as a result of the liveness detection, the verification target may not be allowed to proceed to a user verification operation, or user verification may be finally determined to be unsuccessful irrespective of a result of the user verification. Herein, a liveness detection apparatus or method may also include face (or other) verification and/or recognition.

FIG. 2 illustrates examples of a fake face 210 and an example of a genuine face 220. A liveness detection apparatus configured to perform liveness detection may identify the genuine face 220 in a detection target image that is obtained by capturing an image of a genuine face of a valid user, and distinguish the genuine face 220 from the fake face 210 in a detection target image that is obtained by capturing an image of the genuine face of the valid user which is displayed on a screen of a smartphone or a screen of a personal computer (PC), or printed on a paper.

Referring back to FIG. 1, in an example, the liveness detection apparatus may be included in, or represented by, a computing apparatus 120. The computing apparatus 120 may be a smartphone, a wearable device, a tablet computer, a netbook, a laptop computer, a desktop computer, a personal digital assistant (PDA), a set-top box, a home appliance, a biometric door lock, a security device, and/or a vehicle start device, as non-limiting examples. In another example, the liveness detection apparatus may receive a captured image from the computing apparatus 120 through a communication network, detect whether an object included in the image is a living or lifeless object, and transmit a result of the detecting to the computing apparatus 120. In an example, the liveness detection apparatus may be a server and a cloud device, as non-limiting examples.

In an example illustrated in FIG. 1, a user 110 may attempt user verification for the computing apparatus 120 through facial verification. For example, in a case in which the user 110 attempts the facial verification to cancel (or unlock) a lock state of the computing apparatus 120, the computing apparatus 120 may obtain a face image of the user 110 using a camera 130 (e.g., a camera 130 including a dual pixel sensor), analyze the obtained face image, and determine whether to cancel the lock state of the computing apparatus 120 based on a result of the analyzing. In an example, when the user verification is successful, the computing apparatus 120 may cancel the lock state and allow the user 110 to have access to the computing apparatus 120. Conversely, when the user verification is unsuccessful, the computing apparatus 120 may continue to operate in the lock state.

For another example, in a case in which the user 110 attempts facial verification to use a payment service in the computing apparatus 120, the computing apparatus 120 may obtain a face image of the user 110, analyze the obtained face image, and approve or implement a payment request from the user 110 when the user 110 is recognized as a valid user as a result of the analyzing, or reject the payment request otherwise.

In such user verification, before or after a result of the user verification is determined, the liveness detection may be performed by the liveness detection apparatus to determine whether a verification target for the user verification is a living object or a lifeless object. In response to a determination that the verification target is a living object as a result of the liveness detection, and the verification target is recognized as a valid or legitimate user as a result of the user verification, the computing apparatus 120 may cancel the lock state or approve the payment request. Conversely, in response to a determination that the verification target is a lifeless object or is not recognized as a valid or legitimate user, the computing apparatus 120 may continue to operate in the lock state or reject the payment request.

That is, in a case in which the user verification is performed before the liveness detection is performed, a final result of the user verification may be determined to be a failure when the liveness detection is determined to be unsuccessful or when the verification target is determined to be a lifeless object, even though the user verification performed before is determined to be successful.

In such liveness detection process, the liveness detection apparatus may comprehensively consider various elements of an image captured by the camera 130, and detect liveness of an object included in the captured image. For example, the liveness detection apparatus may determine whether an object, which is a target for liveness detection, is live or not based on any one or any combination of any two or more of shape information associated with an overall shape of a face in the captured image, texture information associated with a texture of a partial face, and context information. An image captured when an object is in a remote location may include a clue as to whether the object is a screen of a display device, or a paper. For example, the image may include a hand of a user holding the display device or the paper, which may provide a clue to a determination that the object is fake. An attempt for a false acceptance may also be effectively detected based on the context information. In addition, the shape information of an overall face shape may be used to determine reflection of light and a distortion of the shape which may be used to determine a result of the liveness detection. As a non-limiting example, such light reflection in a photo image or a paper, which is one of various techniques for such an attempt, may be different from that on a genuine face, and such shape distortion may occur due to a wrinkle or crease of the photo image or the paper. The liveness detection may be performed based on one or more of these foregoing elements. In addition, based on the texture information, a fine difference in texture which may be used to distinguish between a real human skin, and a paper and/or a screen of a display device may be determined. Thus, the liveness detection apparatus may comprehensively apply various levels of such liveness determining elements to improve accuracy of the liveness detection and perform the liveness detection more robustly.

The liveness detection apparatus may use a machine-learning model approach, e.g., a neural network-based liveness detection model to perform the liveness detection. The liveness detection model may provide score information indicating a probability that a target for the liveness detection corresponds to a genuine face or a fake face based on input data. For example, in response to a score obtained from the liveness detection model being greater than a threshold score, the liveness detection apparatus may determine the target to be a genuine face. Conversely, in response to the score being less than or equal to the threshold score, the liveness detection apparatus may determine the target to be a fake face. For the liveness detection model, parameters to be included in the liveness detection model may be determined through a training process performed based on various sets of training data.

Hereinafter, examples of an operation of a liveness detection apparatus to detect liveness of an object will be described in greater detail.

Figure 3:
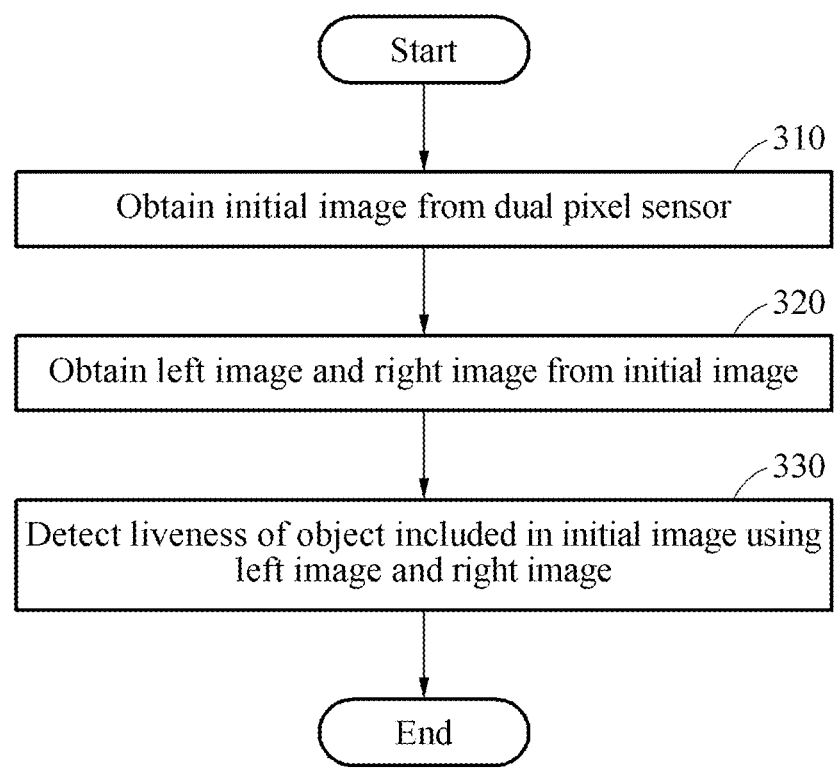
FIG. 3 is a flowchart illustrating an example of a liveness detection method.

FIG. 3 is a flowchart illustrating an example of a liveness detection method.

The liveness detection method to be described hereinafter with reference to FIG. 3 may be performed by a processor (for example, one or more processors) included in a liveness detection apparatus.

Referring to FIG. 3, in operation 310, the liveness detection apparatus may obtain an initial image from a dual pixel sensor. The dual pixel sensor may be a single camera including dual pixels each including two photodiodes. For a further detailed description, reference may be made to FIGS. 4 through 6, as non-limiting examples.

In operation 320, the liveness detection apparatus may obtain a left image and a right image from the initial image. The liveness detection apparatus may separate left and right signals included in each of pixels in the initial image, and reconstruct the left image and the right image from the separated left and right signals, respectively. For a further detailed description, reference may be made to FIG. 9, as a non-limiting example.

In operation 330, the liveness detection apparatus may detect liveness of an object included in the initial image using the left image and the right image. The liveness detection apparatus may process the left image and the right image, and detect the liveness of the object based on a liveness score obtained from a neural network after inputting a result of the processing to the neural network. For a further detailed description, reference may be made to FIGS. 10 through 17, as non-limiting examples.

Figure 4:
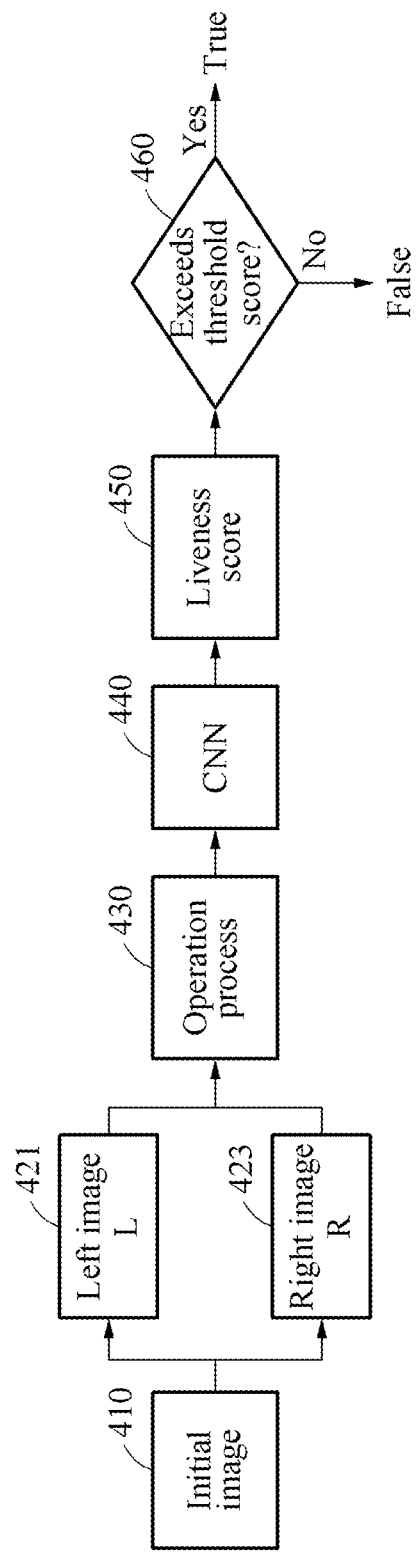
FIGS. 4 and 5 are diagrams illustrating examples of liveness detection.
Figure 5:
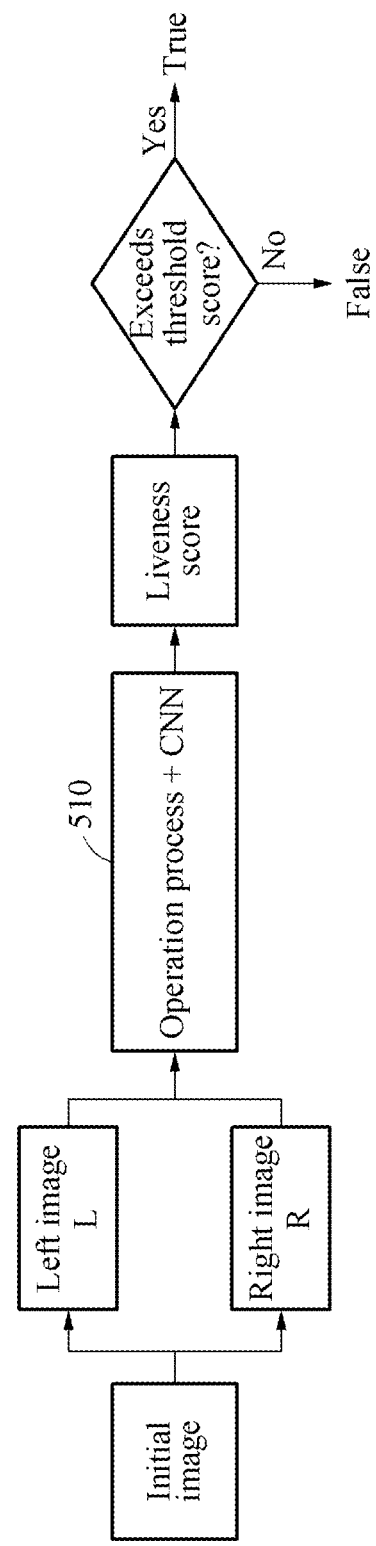

FIGS. 4 and 5 are diagrams illustrating examples of liveness detection.

FIG. 4 illustrates an example of an overall operation of a liveness detection apparatus. Referring to FIG. 4, the liveness detection apparatus may obtain an initial image 410 output from a dual pixel sensor. The initial image 410 may be an image captured by a single camera and include an object, which may be a target for liveness detection. The object may include a part of a body of a user, for example, a face.

The liveness detection apparatus may obtain a left image 421 and a right image 423 from the initial image 410. For the obtaining, a characteristic of the dual pixel sensor capturing the initial image 410 may be used.

The liveness detection apparatus may perform an operation process 430 on the left image 421 and the right image 423. The operation process 430 may include any one or any combination of any two or more of a subtraction operation, a shifting operation, and a differential or derivative operation. Through the operation process 430, the liveness detection apparatus may obtain depth information of the object from the left image 421 and the right image 423.

The liveness detection apparatus may obtain a liveness score 450 of the object by inputting, to a convolutional neural network (CNN) 440, a left image and a right image that are obtained through the operation process 430 performed on the left image 421 and the right image 423. The CNN 440 may be a liveness detection model configured to extract an effective feature from the left image and the right image that are obtained through the operation process 430, and determine a liveness score indicating a probability that the object included in the initial image 410 is a genuine face or a fake face.

The liveness detection apparatus may determine liveness of the object based on whether the liveness score 450 exceeds a threshold score in operation 460. For example, in a case in which the liveness score 450 has a value between [0, 1] and the threshold scores is set as 0.6, the liveness detection apparatus may determine the object to be live when the liveness score 450 has a value greater than 0.6, and to be lifeless otherwise (for example, when the liveness score 450 has a value less than or equal to 0.6).

FIG. 5 illustrates another example of an overall operation of a liveness detection apparatus. In an example of FIG. 5, the operation process 430 and the operation of the CNN 440 that are described above with reference to FIG. 4 as being performed in a certain order may be performed in an order based on various combinations thereof. For example, an operation process may be applied to an output of a CNN and a result of the operation process may be input to the CNN in operation 510, and then a liveness score may be determined. For a detailed description, reference may be made to FIGS. 16 and 17, as non-limiting examples.

Figure 6:
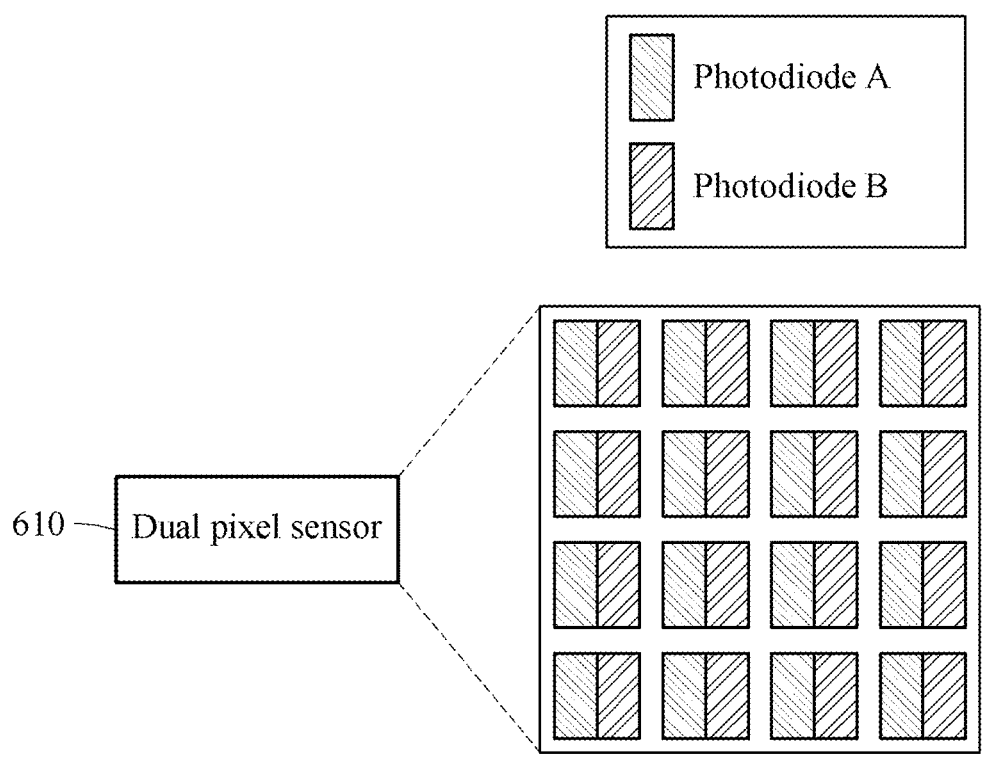
Figure 8:
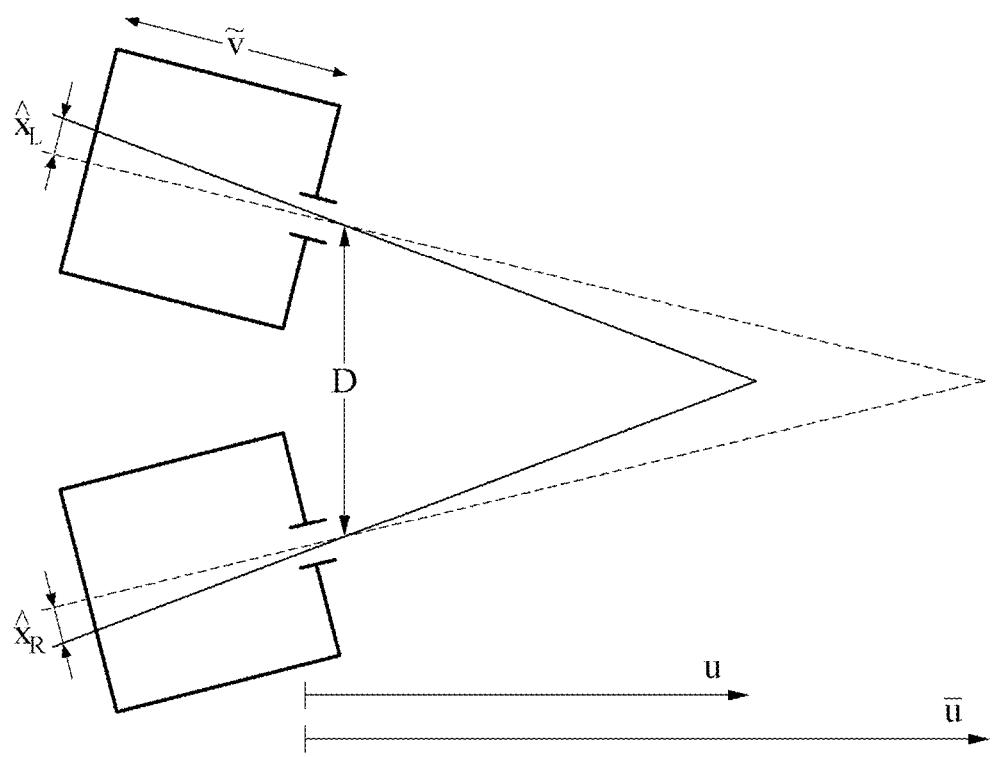

FIGS. 6 through 8 are diagrams illustrating an example of a dual pixel sensor.

FIG. 6 illustrates an example of a dual pixel sensor configured to capture an initial image.

Referring to FIG. 6, a dual pixel sensor 610 may be a single camera including dual pixels each including two photodiodes. The single camera may be a full-pixel dual-core camera, or also referred to as 2PD, which may be effective in fast focusing. The term "full pixel" may indicate all pixels on a complementary metal-oxide semiconductor (CMOS) sensor, and the term "dual pixel" may indicate each pixel including two photodiodes. In an example of FIG. 6, each pixel may include a photodiode A and a photodiode B, and these photodiodes A and B may independently receive light energy and output electrical energy. Through the two photodiodes A and B included in each pixel, two signals or information for each pixel may be obtained when capturing an image.

Similar to a human being sensing a distance with both eyes, there may be a disparity in a same object between the two signals obtained through the two photodiodes A and B in each pixel. A distance to the object may be determined based on a phase difference due to such disparity.

FIG. 7 illustrates an example of a phase difference (e.g., a disparity) between a left image and a right image. Respective signals obtained by two photodiodes included in each pixel may respectively correspond to a left image and a right image in a stereovision model. A difference between a relative position of a same object in the left image and a relative position of the object in the right image may be referred to as a phase difference. In an example of FIG. 7, a phase difference d is a value obtained by $x_L - x_R$ ($d = x_L - x_R$), in which $x_L$ indicates a position of the object in the left image and $x_R$ indicates a position of the object in the right image.

FIG. 8 illustrates an example of an imaging principle of a dual pixel sensor using a stereovision model. A relationship between a phase difference d and a depth distance u may be represented by Equation 1, for example.

$$d = x_L - x_R = D(uF - vu + Fv)/Fu = Df(u)$$  Equation 1:

In Equation 1, D denotes a distance between two cameras in the stereovision model, F denotes a focal length, and v denotes a distance between an imaging element and a lens. When equipment calibration is completed, D, F, and v may be known in advance, and have set values. Thus, the phase difference d and the depth distance u may have a one-to-one matching relationship with each other.

The dual pixel sensor may have a zero-parallax point which may also be referred to as a vergence point. For example, when the vergence point is 35 centimeters (cm) away, a phase difference of an object being present 35 cm away from a camera may be 0.

Figure 9:
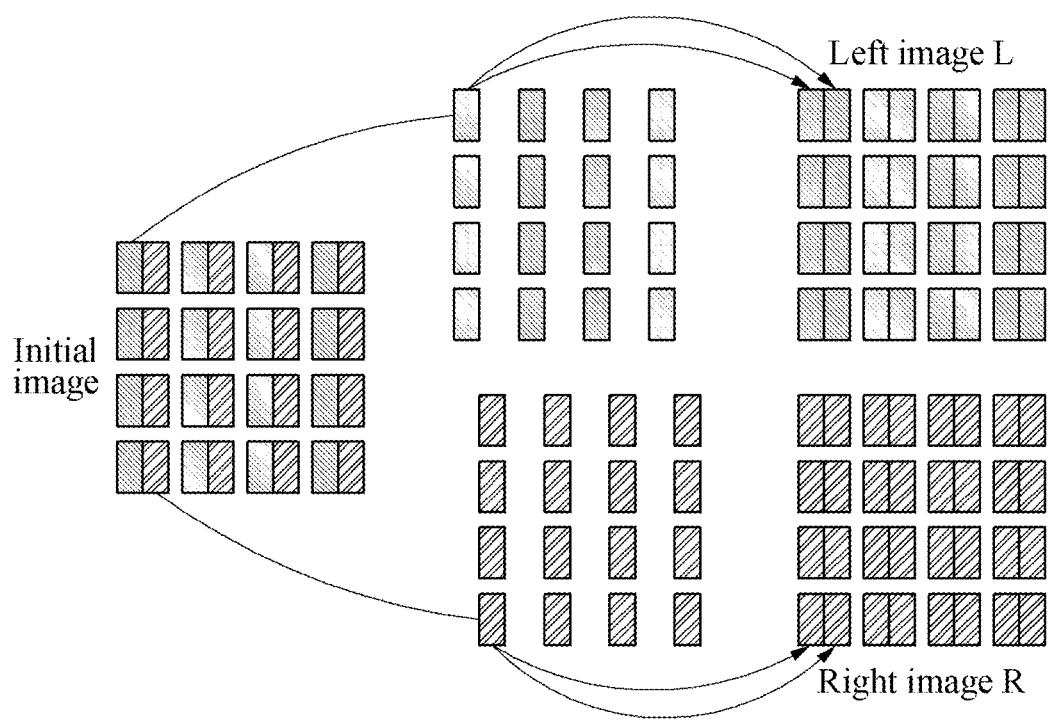
FIG. 9 is a diagram illustrating an example of obtaining a left image and a right image from an initial image.

FIG. 9 is a diagram illustrating an example of obtaining a left image and a right image from an initial image.

FIG. 9 illustrates an example of how a left image and a right image may be obtained from an initial image captured by a dual pixel sensor. In an example, the initial image may include pixels each including two signals. In an example, left and right signals included in each of the pixels in the initial image may be separated. A left image and a right image may be reconstructed from the separated left and right signals, respectively. The reconstructed left image and the reconstructed right image may have a same field of view and a same image content, but have a phase difference therebetween for a same object. Here, two photodiodes obtaining the two signals may be arranged in close proximity to each other, and thus a phase difference may be extremely small, for example, a size corresponding to one or two pixels.

Figure 10:
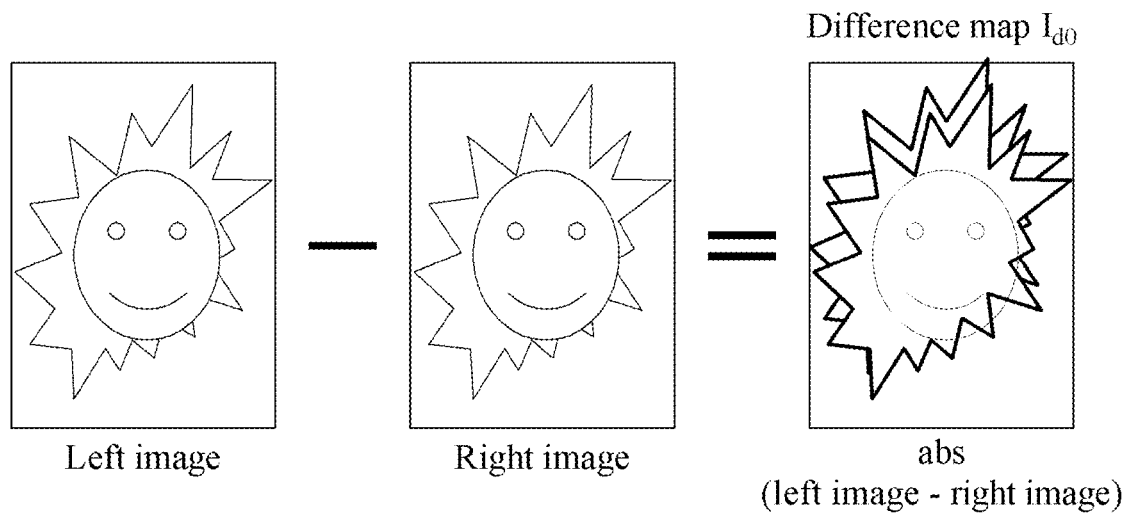
FIGS. 10 through 12 are diagrams illustrating examples of processing a left image and a right image based on a subtraction operation.
Figure 11:
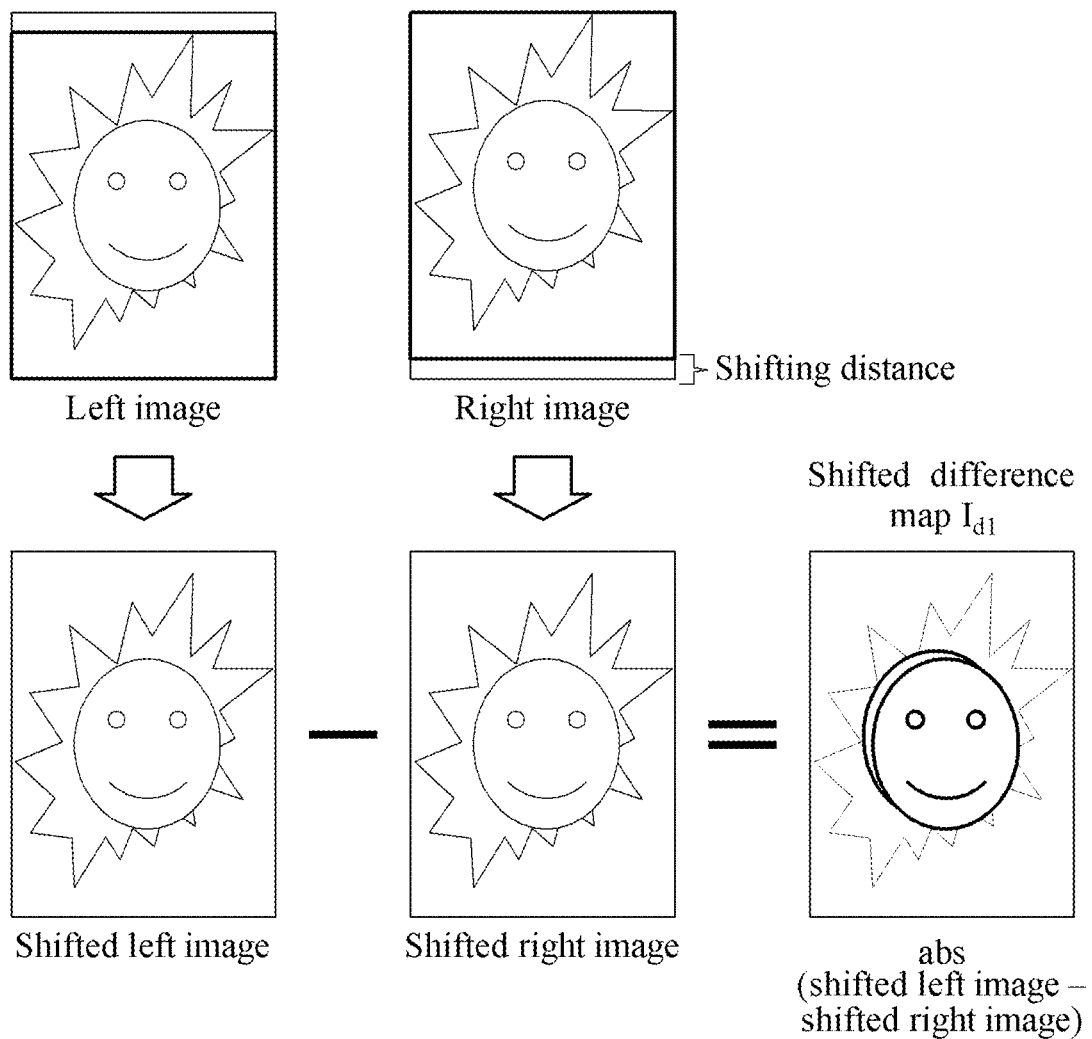
Figure 12:
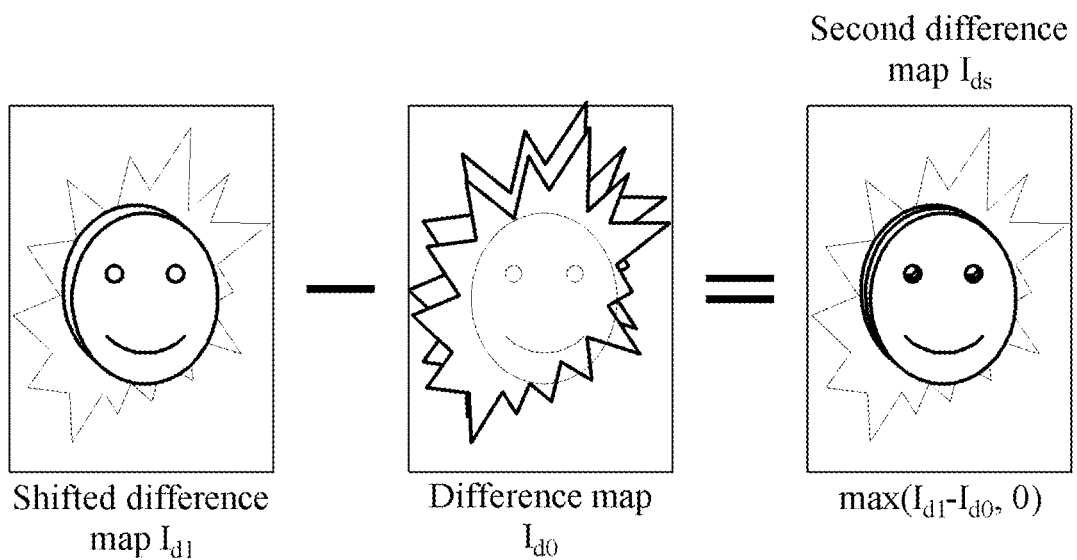

FIGS. 10 through 12 are diagrams illustrating examples of processing a left image and a right image based on a subtraction operation.

FIG. 10 illustrates an example of calculating a difference between a left image and a right image through a subtraction operation. Referring to FIG. 10, a difference in pixel value between a left image and right image may be calculated, and a difference map $I_{d0}$ is determined as represented by Equation 2, for example. A difference map may also be referred to as a phase difference map.

$$I_{d0}=\text{abs}(L-R) \quad \text{Equation 2:}$$

In Equation 2, L and R may denote a pixel value of the left image and a pixel value of the right image, respectively, and abs( ) denotes an absolute value function.

For example, in a case in which, when capturing an image by a camera of a smartphone, a person is positioned at a zero-parallax point, for example, a point 35 cm away from the camera, there may be no parallax occurring between a left image and a right image for a face of the person. In an example, when performing a subtraction operation, the face of the person may be at a same position in the left image and the right image, and thus a feature of the face may be attenuated in a difference map. In contrast, when capturing the image by the camera of the smartphone, a distance between the camera and a background may be greater than 35 cm. That is, a background object may not be positioned at the zero-parallax point, and thus the left image and the right image may have a non-zero parallax for the background object. Thus, when performing the subtraction operation, a feature of the background object may be intensified in the difference map due to the non-zero parallax.

A feature in a difference map obtained through a subtraction operation may be directly related to a distance to an object in an image. For example, when an object (e.g., a foreground object) is positioned at a zero-parallax point, a feature of the object in a difference map may be weak (e.g., wherein the feature of the object having a zero value, a negative value, and/or a value less than or equal to a threshold may be determined to be weak). However, when an object (e.g., a background object) is not positioned at the zero-parallax point, a feature of the object in the difference map may be strong (e.g., wherein the feature of the object having a positive value and/or a value greater than or equal to a threshold may be determined to be strong).

In an example of FIG. 10, a smiling face indicates a foreground object that is positioned at a zero-parallax point, and a stellated shape behind the smiling face indicates a background object that is not positioned at the zero-parallax point. In the difference map $I_{d0}$, that the smiling face is thinly depicted indicates that a feature of the smiling face is attenuated by a subtraction operation, and that the stellated shape is thickly depicted indicates that a feature of the stellated shape is intensified by the subtraction operation.

FIG. 11 illustrates an example of calculating a difference between a left image and a right image through a shifting operation and a subtraction operation.

A shifting operation may truncate a left image and a right image by different positions or portions and shift them in different directions. In an example of FIG. 11, a left image may be shifted upwards and a right image shifted downwards. A difference in pixel value between the shifted left image and the shifted right image may be calculated, and a shifted difference map $I_{d1}$ determined as represented by Equation 3, for example. A shifted difference map may also be referred to as a shifted phase difference map.

$$I_{d1}=\text{abs}(L'-R') \quad \text{Equation 3:}$$

In Equation 3, L' and R' denote the shifted left image and the shifted right image, respectively.

For example, a foreground object may be positioned adjacent to a zero-parallax point before being shifted, and thus there may be no parallax for the foreground object. However, a background object may not be positioned adjacent to the zero-parallax point, and thus there may be a non-zero parallax for the background object. In an example of FIG. 11, a lower portion of the left image may be truncated, and objects included in the left image may be translated upwards in parallel. In addition, an upper portion of the right image may be truncated, and objects included in the right image may be translated downwards in parallel. Through such shifting operation, a background object may have a zero parallax, and a foreground object may have a non-zero parallax. In a shifted difference map determined by performing a subtraction operation on a shifted left image and a shifted right image, a feature of the background object may be weak, and a feature of the foreground object may be strong. For example, in the difference map, a maximum feature value may correspond to a background area of an initial image, while in the shifted difference map, a maximum feature value may correspond to a foreground area of the initial image.

Here, a shifting distance may be a hyperparameter, and have a size corresponding to one pixel, for example. A hyperparameter in machine learning may be a parameter preset before training, and not be a parameter obtained through the training. By selecting an optimized hyperparameter, training performance may be improved.

FIG. 12 illustrates an example of calculating a difference between a difference map and a shifted difference map through a second subtraction operation. In an example of FIG. 12, the subtraction operation and the shifting operation described above with reference to FIGS. 10 and 11 may be performed in sequential order.

In a difference map, a feature of a foreground object may be relatively weak, and a feature of a background object may be relatively strong. In a shifted difference map, the feature of the foreground object may be relatively strong, and the feature of the background may be relatively weak. In an example of FIG. 12, a second subtraction operation may be performed on the difference map and the shifted difference map, and a threshold value α may be applied to a result of the second subtraction operation. A second difference map $I_{ds}$ may then be determined as represented by Equation 4, for example.

$$I_{ds}=\max(\alpha, I_{d1}-I_{d0}) \quad \text{Equation 4:}$$

In Equation 4, max(a, b) denotes a maximum value function that outputs a greater value between a and b. For example, the threshold value α may be set as 0. In an example, a difference between the difference map and the shifted difference map may be included in the second difference map $I_{ds}$ when the difference is a positive value, and the difference may be discarded and 0 may be included in the second difference map $I_{ds}$ when the difference is a negative value.

For example, a foreground object may have a relatively weak feature in a difference map $I_{d0}$ before being shifted, and a relatively strong feature in a shifted difference map $I_{d1}$. Thus, a result value obtained by performing a second subtraction operation may be a positive value which is greater than 0, and thus the result value of the second subtraction operation may be maintained and included in a second difference map $I_{ds}$. In contrast, a background object may have a relatively strong feature in the difference map $I_{d0}$ before being shifted, and a relatively weak feature in the shifted difference map $I_{d1}$. Thus, a result value obtained by performing the second subtraction operation may be a negative value which is less than 0, and thus the result value of the second subtraction operation may be discarded and 0 may be included in the second difference map $I_{ds}$.

As described above, through the second subtraction operation, the feature of the foreground object may be additionally intensified, and the feature of the background object may be attenuated with 0.

Figure 13:
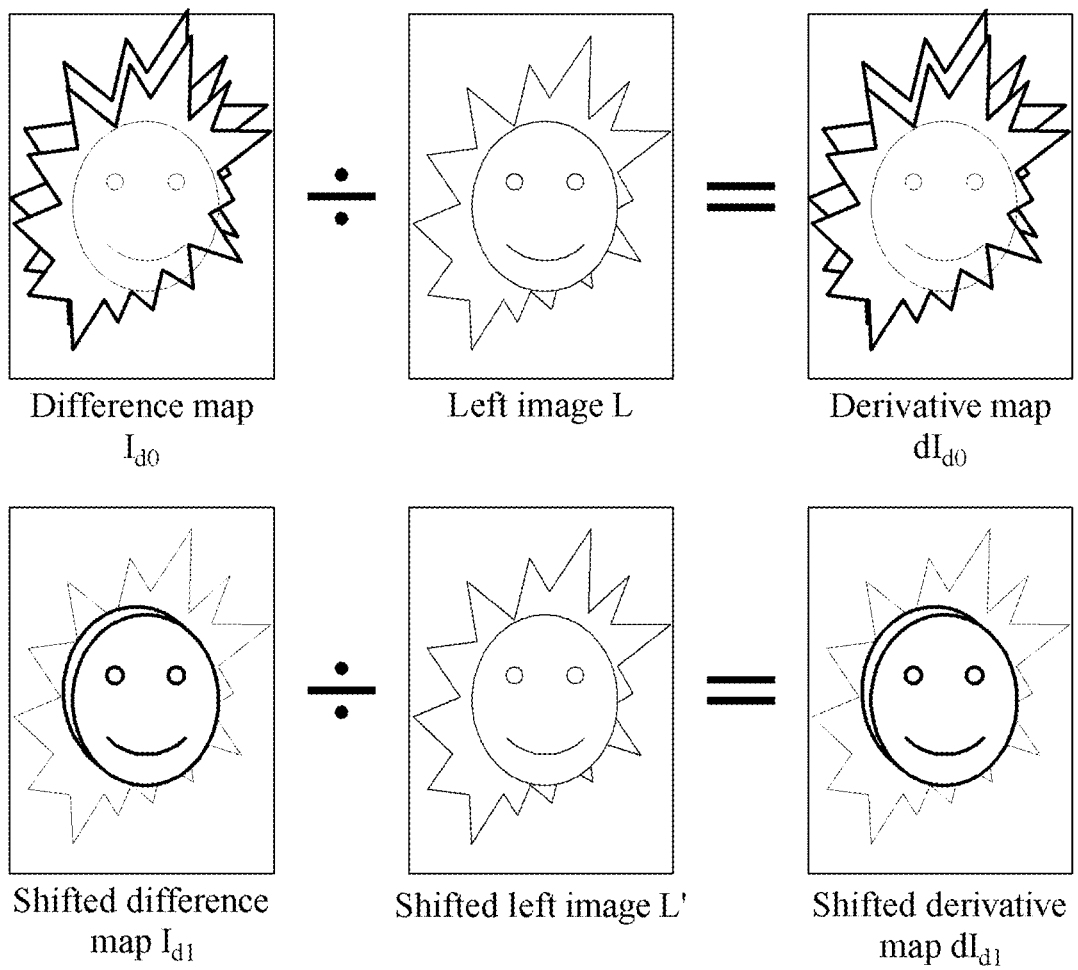
FIGS. 13 and 14 are diagrams illustrating examples of processing a left image and a right image based on a differential operation.
Figure 14:
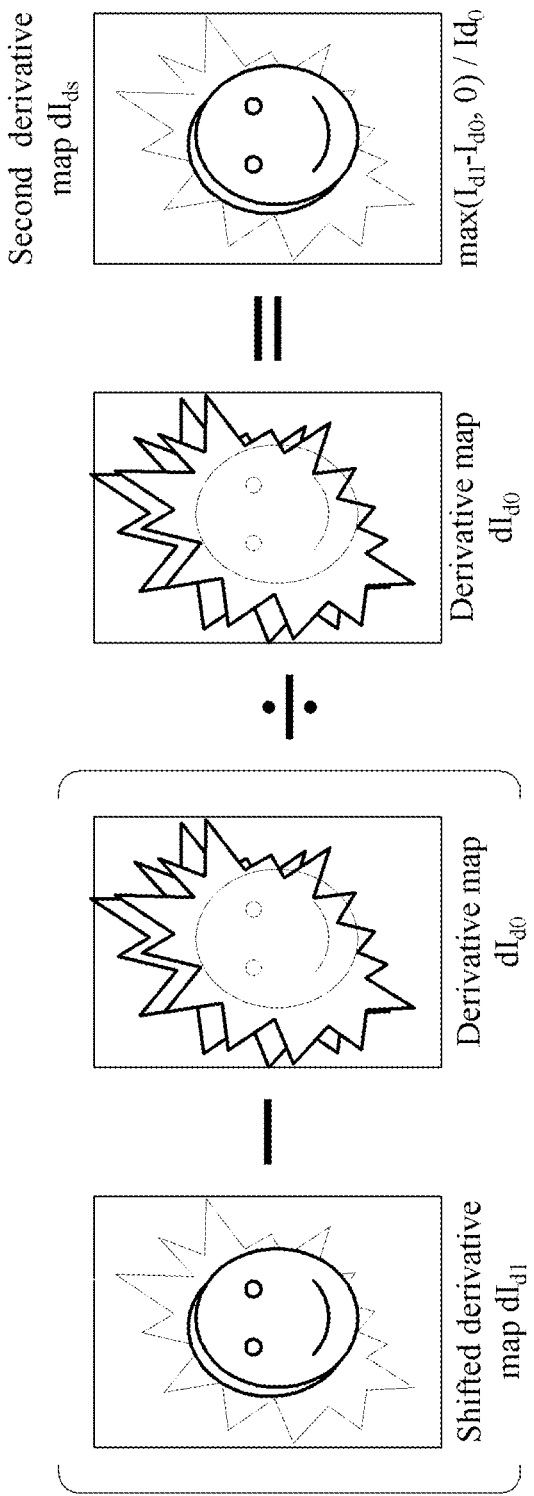

FIGS. 13 and 14 are diagrams illustrating examples of processing a left image and a right image through a differential operation.

FIG. 13 illustrates an example of obtaining a derivative map and a shifted derivative map based on a differential operation.

A differential operation may be used to attenuate an influence of an ambient illumination on a captured image. The differential operation may be similar to a differentiation in mathematics. A differential operation on a left image and a right image may be calculated based on a ratio of a difference between the left image and the right image to one of the left image and the right image. A derivative map $dI_{d0}$ and a shifted derivative map $dI_{d1}$ may be calculated as represented by Equation 5, for example.

$$dI_{d0}=\text{abs}(L-R)/L$$

$$dI_{d1}=\text{abs}(L'-R')/L' \quad \text{Equation 5:}$$

For example, when capturing an image outdoors, there may be relatively strong light, and thus brightness of a left image and a right image may be relatively great and an absolute value of pixels thereof may be relatively great accordingly. Thus, a difference between the left image and the right image may be relatively great. In contrast, in a low-illumination environment, brightness of a left image and a right image may be relatively low, and an absolute value of pixels thereof may be relatively low accordingly. Thus, a difference between the left image and the right image may be relatively low. Such deviation may affect detection of a difference between a feature of a foreground object and a feature of a background object. Here, a differential operation may be performed to effectively remove an influence of an absolute value of brightness of an initial image, and thus a liveness detection apparatus of the present disclosure may advantageously detect features of a foreground object and a background object that are less sensitive to an influence of an outdoor illumination.

Equation 5 above represents a differential operation performed based on a ratio between a difference between a left image and a right image to the left image. However, the differential operation may also be performed based on a ratio between the difference to the right image, which is represented by Equation 6, for example.

$$dI_{d0}=\text{abs}(L-R)/R$$

$$dI_{d1}=\text{abs}(L'-R')/R' \quad \text{Equation 6:}$$

In an example, a differential operation may replace the subtraction operation and/or the shifting operation that are described above with reference to FIGS. 10 through 12. For example, a difference map may be obtained by performing the subtraction operation on a left image and a right image, and a derivative map may be obtained by performing the differential operation thereon. Alternatively, instead of performing both the subtraction operation and the differential operation, a liveness detection apparatus of the present disclosure may select between the subtraction operation and the differential operation, and the selected operation may be performed. For example, the liveness detection apparatus may determine whether to perform the subtraction operation or the differential operation on an image based on a determined brightness of the image. For example, the liveness detection apparatus may determine the brightness of the image, perform the subtraction operation on the image in response to the brightness being greater than or equal to the threshold, and perform the differential operation on the image in response to the brightness being less than or equal to a threshold. In addition, a shifted difference map may be obtained by performing the subtraction operation and the shifting operation on the left image and the right image, and a shifted derivative map may be obtained by performing the shifting operation and the differential operation thereon. Alternatively, instead of performing both the subtraction operation and the differential operation, a liveness detection apparatus of the present disclosure may select between the subtraction operation and the differential operation, and the selected operation may be performed.

FIG. 14 illustrates an example of obtaining a second derivative map based on a second differential operation. A second differential operation may indicate performing a differential operation on a derivative map and a shifted derivative map, which may be represented by Equation 7, for example.

$$dI_{ds}=\max(\alpha,dI_{d1}-dI_{d0})/(dI_{d0}) \quad \text{Equation 7:}$$

In an example, a second derivative map $I_{ds}$ may be obtained based on a ratio of a difference between the derivative map and the shifted derivative map to one of the derivative map and the shifted derivative map. For example, a calculated ratio may be included in the second derivative map $I_{ds}$ when the calculated ratio is greater than a threshold value $\alpha$, and the calculated ratio may be discarded and the threshold value $\alpha$ may be included in the second derivative map $I_{ds}$ when the calculated ratio is less than the threshold value $\alpha$.

Through the second differential operation, a feature of a background object may be attenuated while additionally intensifying a feature of a foreground object, and a second derivative map $I_{ds}$ that is robust against an influence of an external illumination may be obtained.

Figure 15:
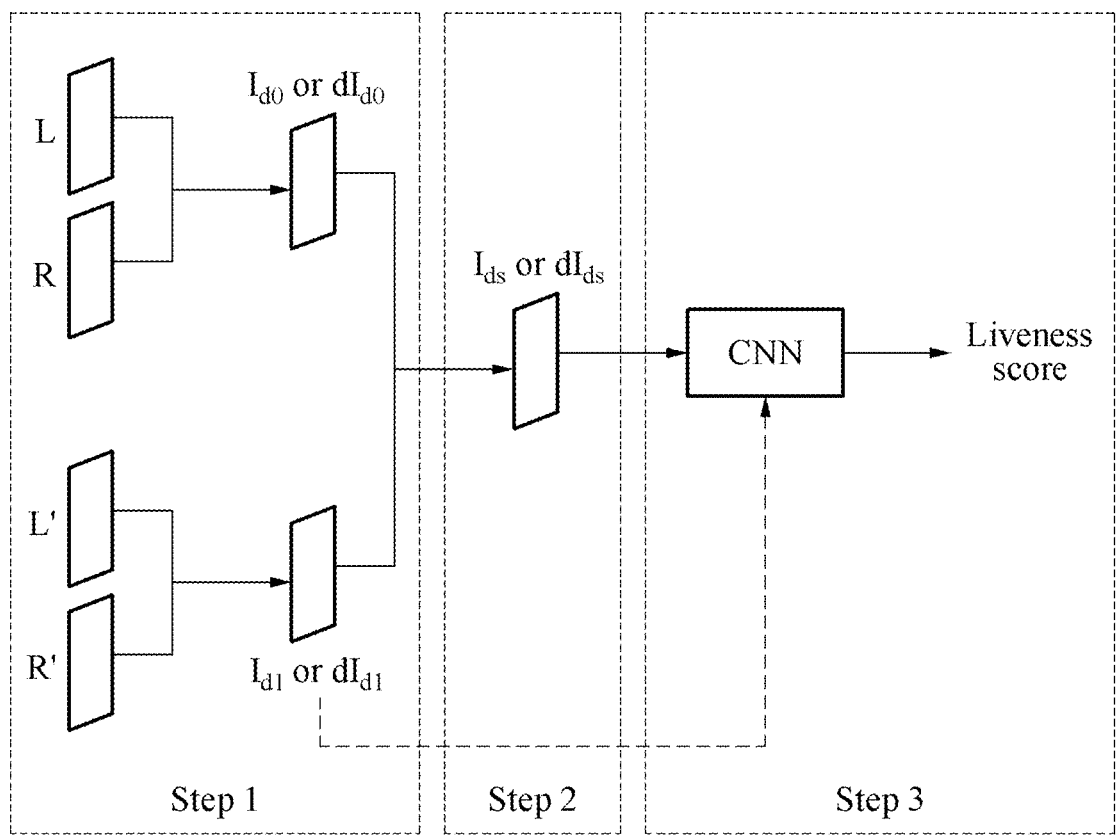
FIGS. 15 through 17 are diagrams illustrating examples of detecting liveness of an object.
Figure 16:
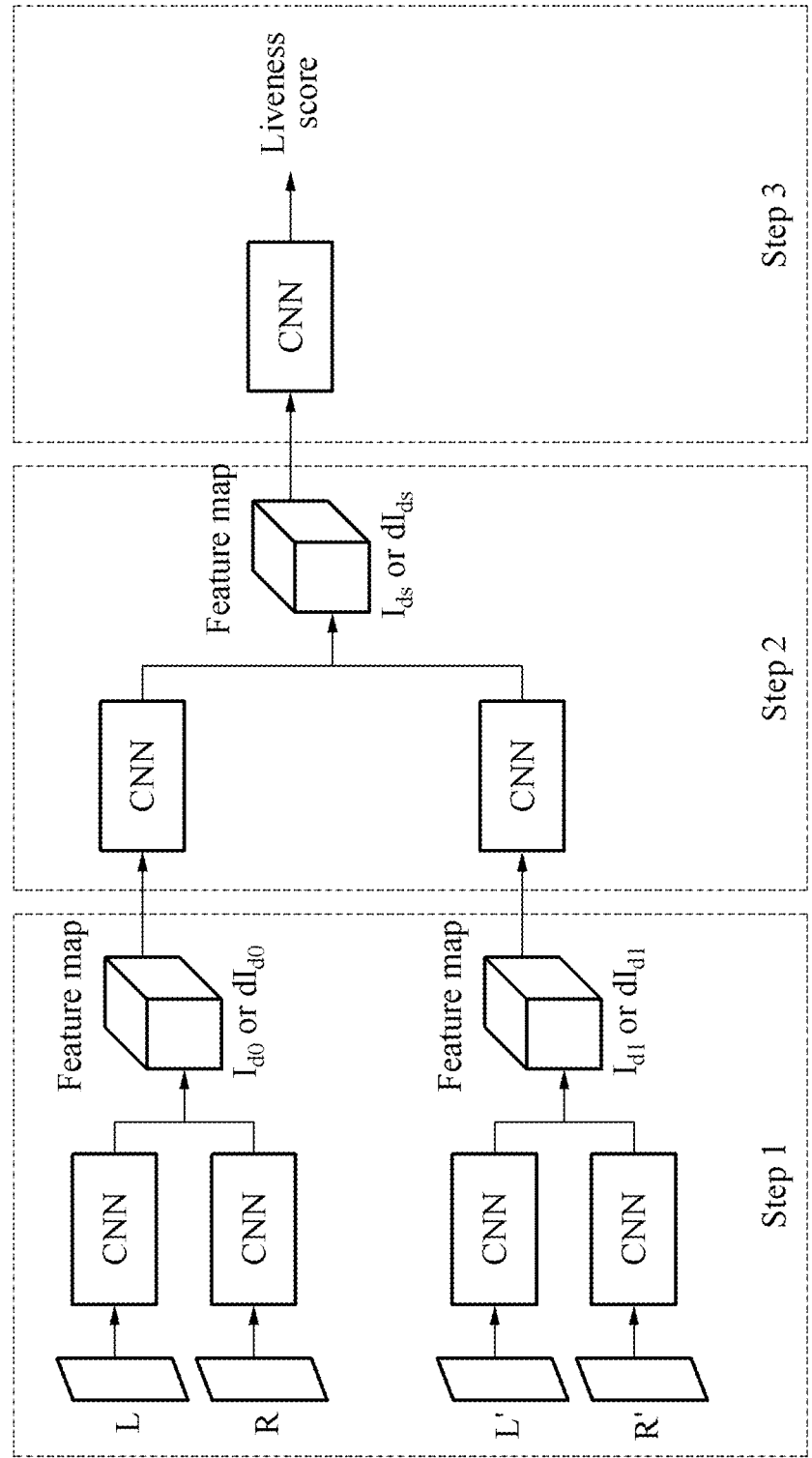
Figure 17:
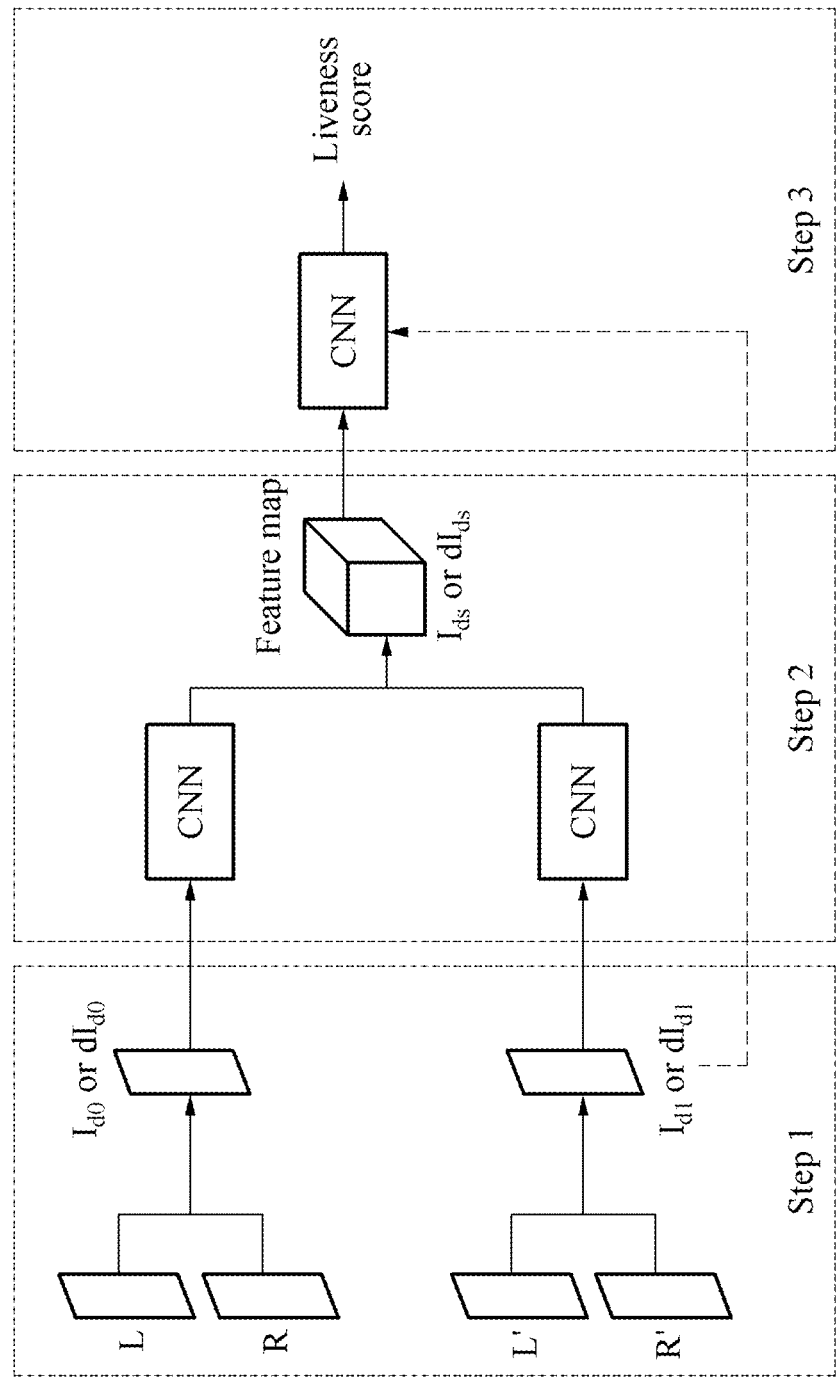

FIGS. 15 through 17 are diagrams illustrating examples of detecting liveness of an object.

FIG. 15 illustrates an example of determining a liveness score of an object at an image level.

Referring to FIG. 1, in step 1, a left image L and a right image R may be obtained from an initial image captured by a dual pixel sensor. In addition, through a shifting operation, a shifted left image L' and a shifted right image R' may be obtained. Through a subtraction operation, a difference map $I_{d0}$ may be obtained from the left image L and the right image R, and a shifted difference map $I_{d1}$ may be obtained from the shifted left image L' and the shifted right image R'. Alternatively or additionally, through a differential operation, a derivative map $dI_{d0}$ may be obtained from the left image L and the right image R, and a shifted derivative map $dI_{d1}$ may be obtained from the shifted left image L' and the shifted right image R'.

In step 2, through a second subtraction operation, a second difference map $I_{ds}$ may be obtained from the difference map $I_{d0}$ and the shifted difference map $I_{d1}$. Alternatively or additionally, through a second differential operation, a second derivative map $dI_{ds}$ may be obtained from the derivative map $dI_{d0}$ and the shifted derivative map $dI_{d1}$.

In step 3, the second difference map $dI_{d0}$ and/or the second derivative map $dI_{ds}$ may be input to a CNN, and a liveness score of an object may be output from the CNN. The liveness score may be for a foreground object included in the initial image. Based on whether the liveness score exceeds a threshold score, liveness of the object may be determined.

In an example, the CNN may be trained in advance to determine the liveness score of the object from the second difference map $dI_{d0}$ or the second derivative map $dI_{ds}$ to be input to the CNN. In an example, the liveness score may have a value between [0, 1]. The CNN may be trained in advance such that the liveness score has a value close to 1 when the object is determined to be alive and a value close to 0 when the object is determined to be not alive. According to an example, refinement through residual learning or shortcut connection may be applied along a broken line illustrated in FIG. 15.

The liveness detection described above may be applied to a small network with a high efficiency and a low computational quantity, and be suitable for a mobile terminal such as a cellphone. Table 1 indicates an example network structure to which the liveness detection is applicable. However, examples to which the liveness detection is applicable are not limited to parameters indicated below in Table 1 including, for example, a network structure, an input size, a size of a convolution kernel, and the number of channels. For example, by reducing a size of an input image, a model size and a computational quantity, for example, an operation amount, may be reduced. In another example, by increasing the number of channels of each convolutional network layer, representation capability of a network and accuracy of a result of the liveness detection may be improved.

TABLE 1

| Layer | Previous layer | Input height | Input width | No. of input channels | No. of output channels | Convolution kernel size | Pad size | Stride size | Output height | Output width |
| --- | --- | --- | --- | --- | --- | --- | --- | --- | --- | --- |
| Convolution 1 | Data | 160 | 120 | 1 | 16 | 3 | 1 | 1 | 160 | 120 |
| Pooling 1 | Convolution 1 | 160 | 120 | | | 2 | | 2 | 80 | 60 |
| Convolution 21 | Pooling 1 | 80 | 60 | 16 | 8 | 1 | 0 | 1 | 80 | 60 |
| Convolution 21_1 × 1 | Convolution 21 | 80 | 60 | 8 | 8 | 1 | 0 | 1 | 80 | 60 |
| Convolution 21_3 × 3 | Convolution 21 | 80 | 60 | 8 | 8 | 3 | 1 | 1 | 80 | 60 |
| Connection 21 | Convolution 21_1 × 1 Convolution 21_3 × 3 | 80 | 60 | | 16 | | | | 80 | 60 |
| Convolution 22 | Connection 21 | 80 | 60 | 16 | 8 | 1 | 0 | 1 | 80 | 60 |
| Convolution 22_1 × 1 | Convolution 22 | 80 | 60 | 8 | 8 | 1 | 0 | 1 | 80 | 60 |
| Convolution 22_3 × 3 | Convolution 22 | 80 | 60 | 8 | 8 | 3 | 1 | 1 | 80 | 60 |
| Connection 22 | Convolution 22_1 × 1 Convolution 22_3 × 3 | 80 | 60 | | 16 | | | | 80 | 60 |
| Pooling 2 | Connection 22 | 80 | 60 | | 16 | 2 | | 2 | 40 | 30 |
| Convolution 31 | Pooling 2 | 40 | 30 | 16 | 16 | 1 | 0 | 1 | 40 | 30 |
| Convolution 31_1 × 1 | Convolution 31 | 40 | 30 | 16 | 16 | 1 | 0 | 1 | 40 | 30 |
| Convolution 31_3 × 3 | Convolution 31 | 40 | 30 | 16 | 16 | 3 | 1 | 1 | 40 | 30 |
| Connection 31 | Convolution 31_1 × 1 Convolution 31_3 × 3 | 40 | 30 | | 32 | | | | 40 | 30 |
| Pooling 3 | Connection 31 | 40 | 30 | | 32 | 2 | | 2 | 20 | 15 |
| Convolution 41 | Pooling 3 | 20 | 15 | 32 | 16 | 1 | 0 | 1 | 20 | 15 |
| Convolution 41_1 × 1 | Convolution 41 | 20 | 15 | 16 | 16 | 1 | 0 | 1 | 20 | 15 |
| Convolution 41_3 × 3 | Convolution 41 | 20 | 15 | 16 | 16 | 3 | 1 | 1 | 20 | 15 |
| connection 41 | Convolution 41_1 × 1 Convolution 41_3 × 3 | 20 | 15 | | 32 | | | | 20 | 15 |
| Convolution | Connection | 20 | 15 | 16 | 16 | 1 | 0 | 1 | 20 | 15 |

TABLE 1-continued

| Layer | Previous layer | Input height | Input width | No. of input channels | No. of output channels | Convolution kernel size | Pad size | Stride size | Output height | Output width |
|---|---|---|---|---|---|---|---|---|---|---|
| 42 | 41 | | | | | | | | | |
| Convolution 42_1 × 1 | Convolution 42 | 20 | 15 | 16 | 16 | 1 | 0 | 1 | 20 | 15 |
| Convolution 42_3 × 3 | Convolution 42 | 20 | 15 | 16 | 16 | 3 | 1 | 1 | 20 | 15 |
| Connection 42 | Convolution 42_1 × 1 Convolution 42_3 × 3 | 20 | 15 | | 32 | | | | 20 | 15 |
| Pooling 4 | Connection 42 | 20 | 15 | | 32 | 2 | | 2 | 10 | 8 |
| Convolution 51 | Pooling 4 | 10 | 8 | 32 | 32 | 1 | 0 | 1 | 10 | 8 |
| Convolution 51_1 × 1 | Convolution 51 | 10 | 8 | 32 | 32 | 1 | 0 | 1 | 10 | 8 |
| Convolution 51_3 × 3 | Convolution 51 | 10 | 8 | 32 | 32 | 3 | 1 | 1 | 10 | 8 |
| Connection 51 | Convolution 51_1 × 1 Convolution 51_3 × 3 | 10 | 8 | | 64 | | | | 10 | 8 |
| Convolution 52 | Connection 51 | 10 | 8 | 64 | 32 | 1 | 0 | 1 | 10 | 8 |
| Convolution 52_1 × 1 | Convolution 52 | 10 | 8 | 32 | 32 | 1 | 0 | 1 | 10 | 8 |
| Convolution 52_3 × 3 | Convolution 52 | 10 | 8 | 32 | 32 | 3 | 1 | 1 | 10 | 8 |
| Connection 52 | Convolution 52_1 × 1 Convolution 52_3 × 3 | 10 | 8 | | 64 | | | | 10 | 8 |
| Pooling 5 | Connection 52 | 10 | 8 | | 64 | 4 | | 4 | 1 | 1 |
| Fully connected layer | Pooling 5 | 1 | 1 | 64 | 2 | | | | 1 | 1 |

FIG. 16 illustrates an example of determining a liveness score of an object at a feature level.

A feature level may indicate processing, by a feature map, a feature extracted from an image through a plurality of layers of a CNN. A size of the feature map may be the same as that of an original image, or may not be the same as that of the original image. The number of channels of the feature map may be greater than that of channels of the original image. By performing a subtraction operation and a differential operation on such feature map, the operations may be performed successively based on a feature of each of the channels, and a difference map and a derivative map at a feature level may be determined. For example, a difference map $I_{d0}^k$ at a feature level may be calculated as represented by Equation 8.

$$I_{d0}^k = \mathrm{abs}(F_L^k - F_R^k), k=\{1,2,\ldots K_1\} \quad \text{Equation 8:}$$

In Equation 8, $F_L^k$ denotes a k-th channel (or k-th dimension) feature of a feature map obtained from a left image through a CNN, and $F_R^k$ denotes a k-th channel (or k-th dimension) feature of a feature map obtained from a right image through a CNN. In addition, $K_1$ denotes a total number of channels, and $I_{d0}^k$ denotes a k-th channel (or k-th dimension) feature of a difference map.

In addition, at a feature level, a shifted difference map $I_{d1}^k$, a second difference map $I_{ds}^k$, a derivative map $dI_{d0}^k$, a shifted derivative map $dI_{d1}^k$, and a second derivative map $dI_{ds}^k$ may be calculated as represented by Equation 9, for example.

$$I_{d1}^k = \mathrm{abs}(F_L^k - F_R^k), k=\{1,2 \ldots K_1\}$$

$$I_{ds}^k = \max(0, I_{d1}^k - I_{d0}^k), \{k=1,2,\ldots K_1\}$$

$$dI_{d0}^k = \mathrm{abs}(F_L^k - F_R^k)/L, k=\{1,2,\ldots K_2\}$$

$$dI_{d1}^k = \mathrm{abs}(F_{L'}^k - F_{R'}^k)/L', k=\{1,2,\ldots K_2\}$$

$$dI_{ds}^k = \max(0, (dI_{d1}^k - dI_{d0}^k)/dI_{d0}^k), k=\{1,2,\ldots K2\} \quad \text{Equation 9:}$$

Referring to FIG. 16, in step 1, a left image L and a right image R may be obtained from an initial image captured by a dual pixel sensor. In addition, through a shifting operation, a shifted left image L' and a shifted right image R' may be obtained. The left image L, the right image R, the shifted left image L', and the shifted right image R' may be converted to corresponding feature maps through CNNs, respectively. For example, the CNNs to which the left image L, the right image R, the shifted left image L', and the shifted right image R' are input, respectively, may share a weight.

In an example of FIG. 16, a feature map may be of a middle level, or a first level. By performing a subtraction operation or a differential operation on the feature maps, a difference map $I_{d0}$ and a shifted difference map $I_{d1}$ at a feature level, or a derivative map $dI_{d0}$ and a shifted derivative map $dI_{d1}$ at a feature level may be obtained.

In step 2, the maps obtained in the previous step may be converted to a corresponding feature map through CNNs, respectively. The feature map may be of a higher level, or a second level. By performing a second subtraction operation or a second differential operation, a second difference map $I_{ds}$ or a second derivative map $dI_{ds}$ at a feature level may be obtained. For example, the CNNs to which the maps obtained in the previous step are input, respectively, may share a weight.

In step 3, the second difference map $I_{ds}$ and/or the second derivative map $dI_{ds}$ obtained in the previous step may be input to a CNN, and then a liveness score of an object may be output from the CNN. The liveness score may be for a foreground object included in the initial image. Based on whether the liveness score exceeds a threshold score, liveness of the object may be determined.

According to an example, refinement through residual learning or shortcut connection may be applied along a broken line illustrated in FIG. 16.

FIG. 17 illustrates an example of determining a liveness score of an object at a combined level of an image level and a feature level.

Referring to FIG. 17, in step 1, a left image L and a right image R may be obtained from an initial image captured by a dual pixel sensor. In addition, through a shifting operation, a shifted left image L' and a shifted right image R' may be obtained. Through a subtraction operation, a difference map $I_{d0}$ may be obtained from the left image L and the right image R, and a shifted difference map $I_{d1}$ may be obtained from the shifted left image L' and the shifted right image R'. Alternatively or additionally, through a differential operation, a derivative map $dI_{d0}$ may be obtained from the left image L and the right image R, and a shifted derivative map $dI_{d1}$ may be obtained from the shifted left image L' and the shifted right image R'.

In step 2, the maps obtained in the previous step may be converted to a corresponding feature map through CNNs, respectively. The feature map may be of a higher level. By performing a second subtraction operation or a second differential operation on the feature map, a second difference map $I_{ds}$ or a second derivative map $dI_{ds}$ at a feature level may be obtained.

In step 3, the second difference map $I_{ds}$ and/or the second derivative map $dI_{ds}$ obtained in the previous step may be input to a CNN, and then a liveness score of an object may be output from the CNN. The liveness score may be for a foreground object included in the initial image. Based on whether the liveness score exceeds a threshold score, liveness of the object may be determined.

According to an example, refinement through residual learning or shortcut connection may be applied along a broken line illustrated in FIG. 17.

Figure 18:
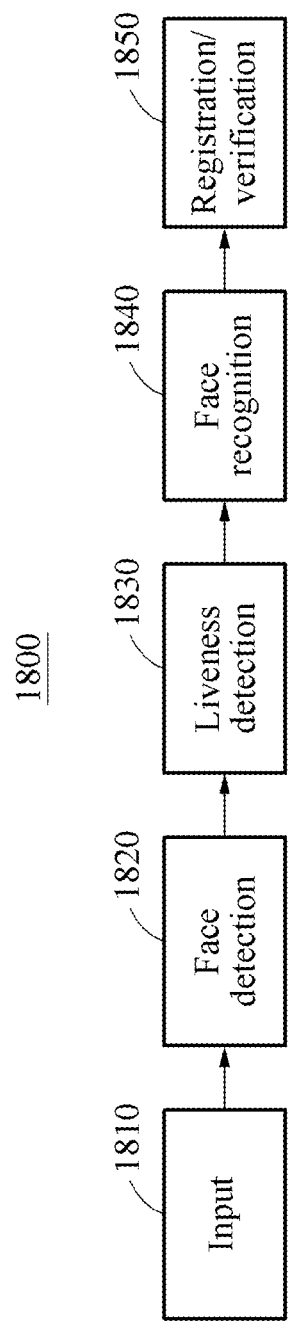
FIG. 18 is a diagram illustrating an example of user verification based on liveness detection.

FIG. 18 is a diagram illustrating an example of user verification based on liveness detection.

Hereinafter, how a verification system 1800 may operate will be described with reference to FIG. 18.

Referring to FIG. 18, in operation 1810, an initial image captured by a dual pixel sensor may be input. In operation 1820, whether a human face is included in the initial image may be detected. In operation 1830, in response to the face being detected, liveness of the face may be detected. For example, whether the face is a genuine face of a living human, or a fake face appearing in a photo image, a paper, a moving image, a replica, and the like may be detected. What is described above in relation to liveness detection is applicable to operation 1830.

When the liveness detection is successful, that is when the face is detected as being a genuine face of a living human, the face may be recognized in operation 1840. For example, whether the face included in the initial image corresponds to a face of a preregistered valid user or not may be determined. In an example, when the face included in the initial image corresponds to the face of the valid user, a person with the face included in the initial image may be recognized as the valid user, and as a new user otherwise.

In operation 1850, registration, or verification or authentication may be performed based on a result of the recognizing. For example, when the person with the face included in the initial image is recognized as the valid user, the verification or authentication may be performed. When the person is recognized as a new user, the registration may be performed.

Figure 19:
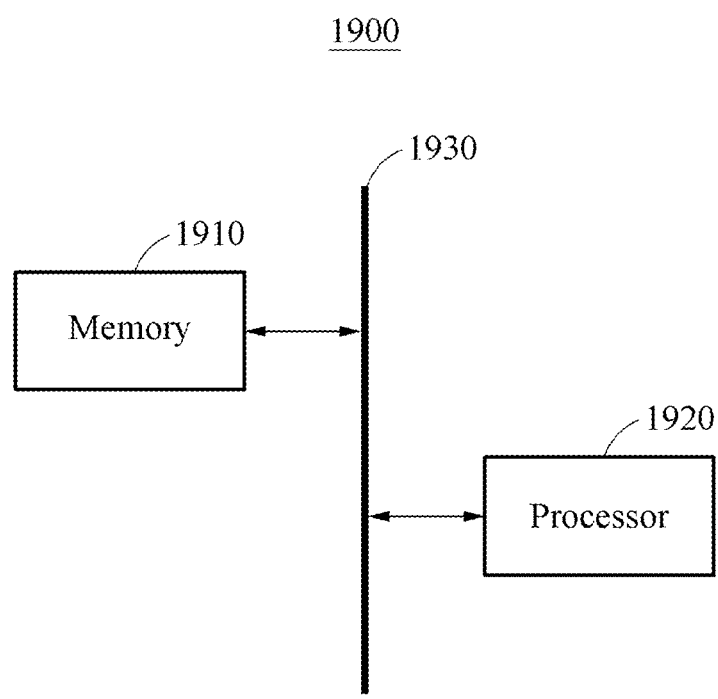
FIG. 19 is a diagram illustrating an example of a liveness detection apparatus.

FIG. 19 is a diagram illustrating an example of a liveness detection apparatus.

Referring to FIG. 19, a liveness detection apparatus 1900 includes a memory 1910 and a processor 1920 (e.g., one or more processors). The memory 1910 and the processor 1920 may communicate with each other through a bus 1930.

The memory 1910 may include a computer-readable instruction or command. When the instruction stored in the memory 1910 is executed by the processor 1920, the processor 1920 may be configured to perform the operations described above. The memory 1910 may be a volatile or nonvolatile memory.

The processor 1920 may execute instructions or programs, or control an operation of the liveness detection apparatus 1900. The processor 1920 may obtain an initial image from a dual pixel sensor, obtain a left image and a right image from the obtained initial image, and detect liveness of an object included in the initial image using the obtained left and right images.

The liveness detection apparatus 1900 may also perform operations that are described herein.

According to example embodiments described herein, a liveness detection method and apparatus based on a dual pixel sensor may enable highly accurate detection of liveness of an object, with high efficiency and low cost, and low computational or operation amount and low power consumption. Moreover, by performing the difference, ratio, and/or shifting operations of example embodiments described herein, feature values in the feature maps corresponding to an image foreground (including a face, e.g.) and/or background may be stronger or more enhanced than in a typical liveness detection method or apparatus, and therefore example embodiments described herein may be configured to more accurately detect depth information in the image, and therefore more accurately perform liveness detection and/or object detection than in the typical liveness detection method or apparatus.

The liveness detection method and apparatus may obtain a discriminative feature equivalent to depth information by processing left and right images obtained from an initial image captured by the dual pixel sensor, without using a depth camera which has relatively high specifications and requires a relatively great amount of power consumption and high costs, and may thus be robust against a distance and a background.

The liveness detection apparatuses, liveness detection apparatus 1900, computing apparatuses, computing apparatus 120, cameras, camera 130, dual pixel sensors, dual pixel sensor 610, processors, processor 1920, memories, memory 1910, buses, bus 1930, and other apparatuses, modules, devices, and other components described herein with respect to FIGS. 1-19 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented liveness detection method comprising:
   obtaining an initial image using a dual pixel sensor;
   obtaining a left image and a right image from the initial image; and
   detecting liveness of an object included in the initial image using the left image and the right image,
   wherein the detecting of the liveness of the object comprises:
      processing the left image and the right image by performing one or more operations using the left image and the right image; and
   detecting the liveness of the object based on a liveness score obtained from a neural network by inputting a result of the processing to the neural network.

2. The method of claim 1, wherein the result of the processing indicates depth information of the object.

3. The method of claim 1, wherein the processing of the left image and the right image comprises:
   determining either one or both of a difference between the left image and the right image, and a ratio of the difference to either one of the left image and the right image.

4. The method of claim 1, wherein the processing of the left image and the right image comprises:
   determining a difference map based on a difference between the left image and the right image;
   determining a shifted difference map by shifting the left image and the right image in different directions, respectively, and calculating a difference between the shifted left image and the shifted right image; and
   determining a second difference map based on a difference between the difference map and the shifted difference map.

5. The method of claim 4, wherein the left image is shifted in either one of an upward or downward direction and the right image is shifted in another one of the upward and downward direction different from the one of the upward or downward direction.

6. The method of claim 1, wherein the processing of the left image and the right image comprises:
   determining a derivative map by calculating a ratio of a difference, between the left image and the right image, to either one of the left image and the right image;
   determining a shifted derivative map by calculating a ratio of a shifted difference, between a shifted left image and a shifted right image respectively obtained by shifting the left image and the right image in different directions, to either one of the shifted left image and the shifted right image; and
   determining a second derivative map based on a ratio of a further difference, between the derivative map and the shifted derivative map, to either one of the derivative map and the shifted derivative map.

7. The method of claim 1, wherein the processing of the left image and the right image comprises:
   determining a difference map based on a difference between a first-level feature map of the left image and a first-level feature map of the right image;
   determining a shifted difference map by calculating a difference, between a shifted first-level feature map of a shifted left image and a first-level feature map of a shifted right image respectively obtained by shifting the left image and the right image in different directions; and
   determining a second difference map based on a difference between a second-level feature map of the difference map and a second-level feature map of the shifted difference map.

8. The method of claim 7, wherein
   the first-level feature map of the left image, the first-level feature map of the right image, the first-level feature map of the shifted left image, and the first-level feature map of the shifted right image are generated by respectively inputting the left image, the right image, the shifted left image, and the shifted right image into a first-level neural network, and
   the second-level feature map of the difference map and the second-level feature map of the shifted difference map are generated by respectively inputting the difference map and the shifted difference map into a second-level neural network.

9. The method of claim 7, wherein the second-level feature maps include a greater number of channels than the first-level feature maps.

10. The method of claim 1, wherein the processing of the left image and the right image comprises:
    determining a derivative map by calculating a ratio of a difference between a first-level feature map of the left image and a first-level feature map of the right image to either one of the first-level feature map of the left image and the first-level feature map of the right image;
    determining a shifted derivative map by calculating a ratio of a difference between a first-level feature map of a left image and a first-level feature map of a right image that are obtained by shifting the left image and the right image in different directions, respectively, to either one of the first-level feature map of the shifted left image and the first-level feature map of the shifted right image; and
    determining a second derivative map based on a ratio of a difference between a second-level feature map of the derivative map and a second-level feature map of the shifted derivative map to either one of the second-level feature map of the derivative map and the second-level feature map of the shifted derivative map.

11. The method of claim 1, wherein the processing of the left image and the right image comprises:
    determining a difference map based on a difference between the left image and the right image;
    determining a shifted difference map by shifting the left image and the right image in different directions, respectively, and calculating a difference between the shifted left image and the shifted right image; and
    determining a second difference map based on a difference between a feature map of the difference map and a feature map of the shifted difference map.

12. The method of claim 11, wherein the feature map of the difference map and the feature map of the shifted difference map are generated by respectively inputting the difference map and the shifted difference map into another neural network.

13. The method of claim 1, wherein the processing of the left image and the right image comprises:
    determining a derivative map by calculating a ratio of a difference between the left image and the right image to either one of the left image and the right image;
    determining a shifted derivative map by calculating a ratio of a difference between a left image and a right image that are obtained by shifting the left image and the right image in different directions, respectively, to one either of the shifted left image and the shifted right image; and determining a second derivative map based on a ratio of a difference between a feature map of the derivative map and a feature map of the shifted derivative map to either one of the feature map of the derivative map and the feature map of the shifted derivative map.

14. The method of claim 1, wherein the dual pixel sensor is a single camera including dual pixels each including two photodiodes.

15. The method of claim 1,
wherein the liveness detection comprises detecting the liveness of the object in response to the object being included in the initial image, and
further comprising:
in response to a determination that the object is live as a result of the liveness detection, performing object recognition on the object; and
performing an operation based on a result of the object recognition.

16. A non-transitory computer-readable storage medium storing instructions that, when executed by one or more processors, configure the one or more processors to perform the method of claim 1.

17. A processor-implemented liveness detection method comprising:
obtaining an initial image using a dual pixel sensor;
obtaining a left image and a right image from the initial image; and
detecting liveness of an object included in the initial image using the left image and the right image,
wherein the obtaining of the left image and the right image from the initial image comprises:
separating left and right signals included in each of pixels in the initial image; and
reconstructing the left image and the right image from the separated left and right signals, respectively.

18. A processor-implemented object recognition method for a computing device, comprising:
obtaining an initial image from a dual pixel sensor;
in response to an object, which is a target for liveness detection, being included in the initial image, detecting liveness of the object using a left image and a right image obtained from the initial image;
in response to a determination that the object is live as a result of the liveness detection, performing object recognition on the object; and
controlling an operation of the computing device based on a result of the object recognition,
wherein the detecting of the liveness of the object comprises:
processing the left image and the right image by performing one or more operations using the left image and the right image; and
detecting the liveness of the object based on a liveness score obtained from a neural network by inputting a result of the processing to the neural network.

19. A liveness detection apparatus comprising:
one or more processors configured to:
obtain an initial image using a dual pixel sensor;
obtain a left image and a right image from the initial image; and
detect liveness of an object included in the initial image using the left image and the right image,
wherein, for the detecting of the liveness of the object, the one or more processors are configured to:
process the left image and the right image by performing one or more operations using the left image and the right image; and
detect the liveness of the object based on a liveness score obtained from a neural network by inputting a result of the processing to the neural network.

20. The apparatus of claim 19, wherein the result of the processing indicates depth information of the object.

21. The apparatus of claim 19, wherein, for the processing of the left image and the right image, the one or more processors are configured to:
determine either one or both of a difference between the left image and the right image, and a ratio of the difference to either one of the left image and the right image.

22. The apparatus of claim 19, wherein the dual pixel sensor is a single camera including dual pixels each including two photodiodes.

23. The apparatus of claim 19, wherein
the apparatus is any of a smartphone, a wearable device, a tablet computer, a netbook, a laptop computer, a desktop computer, a personal digital assistant (PDA), a set-top box, a home appliance, a biometric door lock, a security device, and a vehicle start device, and
the apparatus includes a camera including the dual pixel sensor.

24. A liveness detection apparatus comprising:
one or more processors configured to:
obtain an initial image using a dual pixel sensor;
obtain a left image and a right image from the initial image; and
detect liveness of an object included in the initial image using the left image and the right image,
wherein, for the obtaining of the left image and the right image from the initial image, the one or more processors are configured to:
separate left and right signals included in each of pixels in the initial image; and
reconstruct the left image and the right image from the separated left and right signals, respectively.

25. A liveness detection method comprising:
constructing a left image and a right image from an initial image received from a dual pixel image sensor; and
determining a difference map based on a difference between the left image and the right image;
determining a shifted difference map based on a difference between a truncated image of the left image and a truncated image of the right image;
determining another difference map based on the difference map and the shifted difference map; and
detecting liveness of an object included in the initial image based on the other difference map.

26. The method of claim 25, wherein the other difference map is either one of a second difference map and a second derivative map.

27. The method of claim 25, wherein
in the difference map, a maximum feature value corresponds to a background area of the initial image, and
in the shifted difference map, a maximum feature value corresponds to a foreground area of the initial image.

* * * * *